(12) United States Patent
Kishi et al.

(10) Patent No.: US 12,334,267 B2
(45) Date of Patent: Jun. 17, 2025

(54) MULTILAYER CERAMIC CAPACITOR

(71) Applicant: Murata Manufacturing Co., Ltd., Nagaokakyo (JP)

(72) Inventors: Kotaro Kishi, Nagaokakyo (JP); Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 106 days.

(21) Appl. No.: 17/974,701

(22) Filed: Oct. 27, 2022

(65) Prior Publication Data

US 2023/0154685 A1 May 18, 2023

(30) Foreign Application Priority Data

Nov. 16, 2021 (JP) ................. 2021-186327

(51) Int. Cl.
| | |
|---|---|
| *H01G 4/232* | (2006.01) |
| *H01G 4/012* | (2006.01) |
| *H01G 4/30* | (2006.01) |
| *H01G 4/008* | (2006.01) |
| *H01G 4/12* | (2006.01) |

(52) U.S. Cl.
CPC ............. *H01G 4/232* (2013.01); *H01G 4/012* (2013.01); *H01G 4/30* (2013.01); *H01G 4/008* (2013.01); *H01G 4/1227* (2013.01)

(58) Field of Classification Search
None
See application file for complete search history.

(56) References Cited

U.S. PATENT DOCUMENTS

| | | | |
|---|---|---|---|
| 2003/0026059 A1* | 2/2003 | Togashi | .......... H01G 4/005 361/303 |
| 2008/0074825 A1* | 3/2008 | Togashi | .......... H01G 4/232 361/306.3 |
| 2008/0297977 A1 | 12/2008 | Togashi et al. | |

(Continued)

FOREIGN PATENT DOCUMENTS

| | | |
|---|---|---|
| CN | 101315832 A | 12/2008 |
| CN | 109559893 A | 4/2019 |

(Continued)

OTHER PUBLICATIONS

Office Action in JP2021-186327, mailed Apr. 2, 2024, 3 pages.
Official Communication issued in corresponding Chinese Patent Application No. 202211028941.7, mailed on Oct. 1, 2024, 9 pages.

*Primary Examiner* — Eric W Thomas

(74) *Attorney, Agent, or Firm* — Keating & Bennett, LLP

(57) ABSTRACT

A multilayer ceramic capacitor includes a multilayer body having a dimensional relationship of the dimension in the width direction is greater than the dimension in the length direction which is greater than the dimension in the height direction. The dimension in the width direction of a third surface portion of a first external electrode is smaller than the dimension in the width direction of a first surface portion. The dimension in the width direction of an eighth surface portion of a second external electrode is smaller than the dimension in the width direction of a sixth surface portion. The dimensions in the height direction of a fourth surface portion and a fifth surface portion of the first external electrode are smaller than the dimension in the height direction of the first surface portion.

20 Claims, 31 Drawing Sheets

(56) References Cited

U.S. PATENT DOCUMENTS

| | | | |
|---|---|---|---|
| 2009/0316330 A1 | 12/2009 | Taniguchi et al. | |
| 2018/0174754 A1* | 6/2018 | Kitamura | C04B 35/62605 |
| 2019/0096583 A1 | 3/2019 | Sasaki | |
| 2020/0105472 A1 | 4/2020 | Song et al. | |
| 2020/0118755 A1 | 4/2020 | Yajima et al. | |

FOREIGN PATENT DOCUMENTS

| | | | |
|---|---|---|---|
| JP | 2008300563 A | 12/2008 | |
| JP | 2010-003891 A | 1/2010 | |
| JP | 2019061997 A | 4/2019 | |
| JP | 2020-057753 A | 4/2020 | |
| JP | 2020-061524 A | 4/2020 | |

* cited by examiner

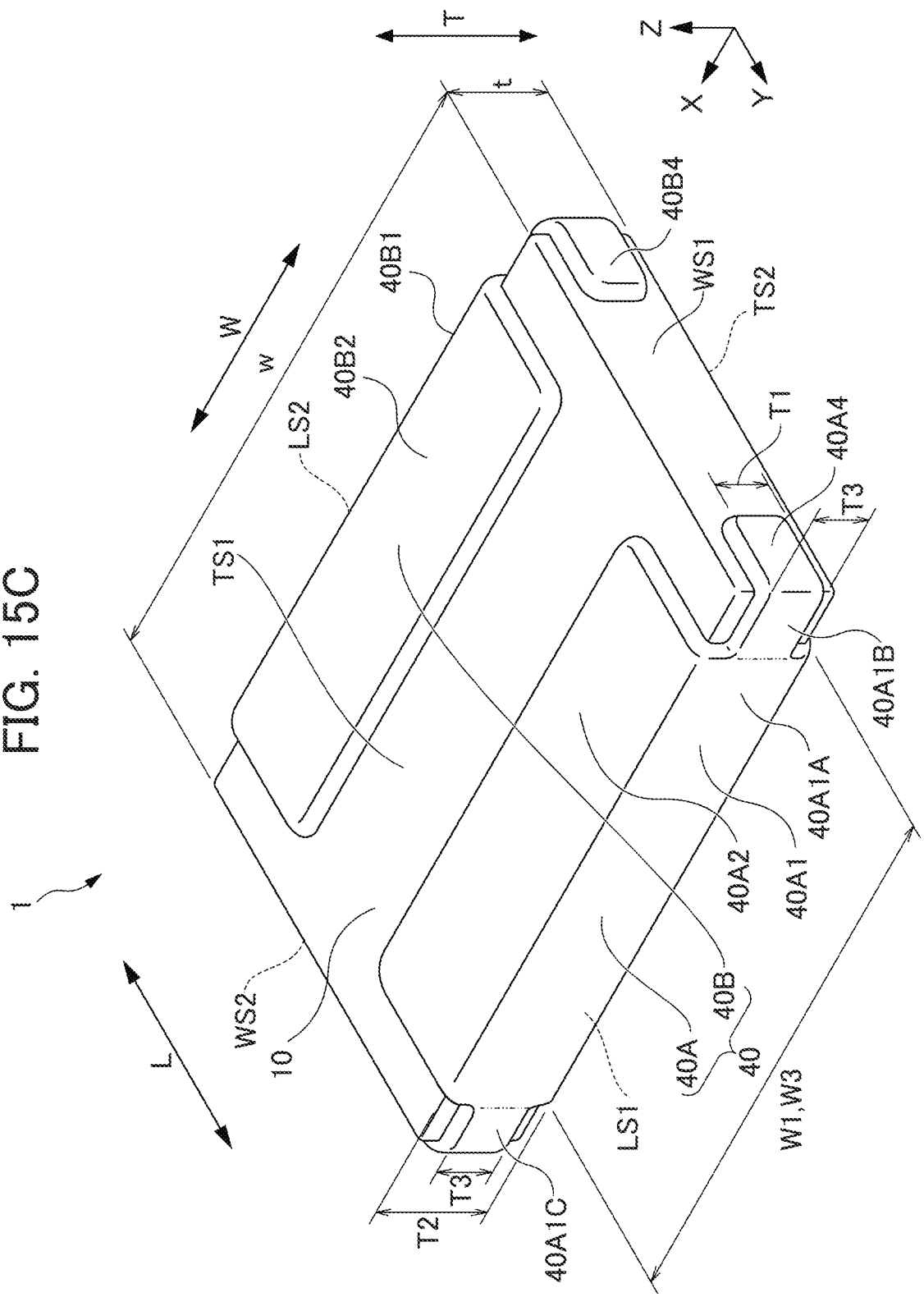

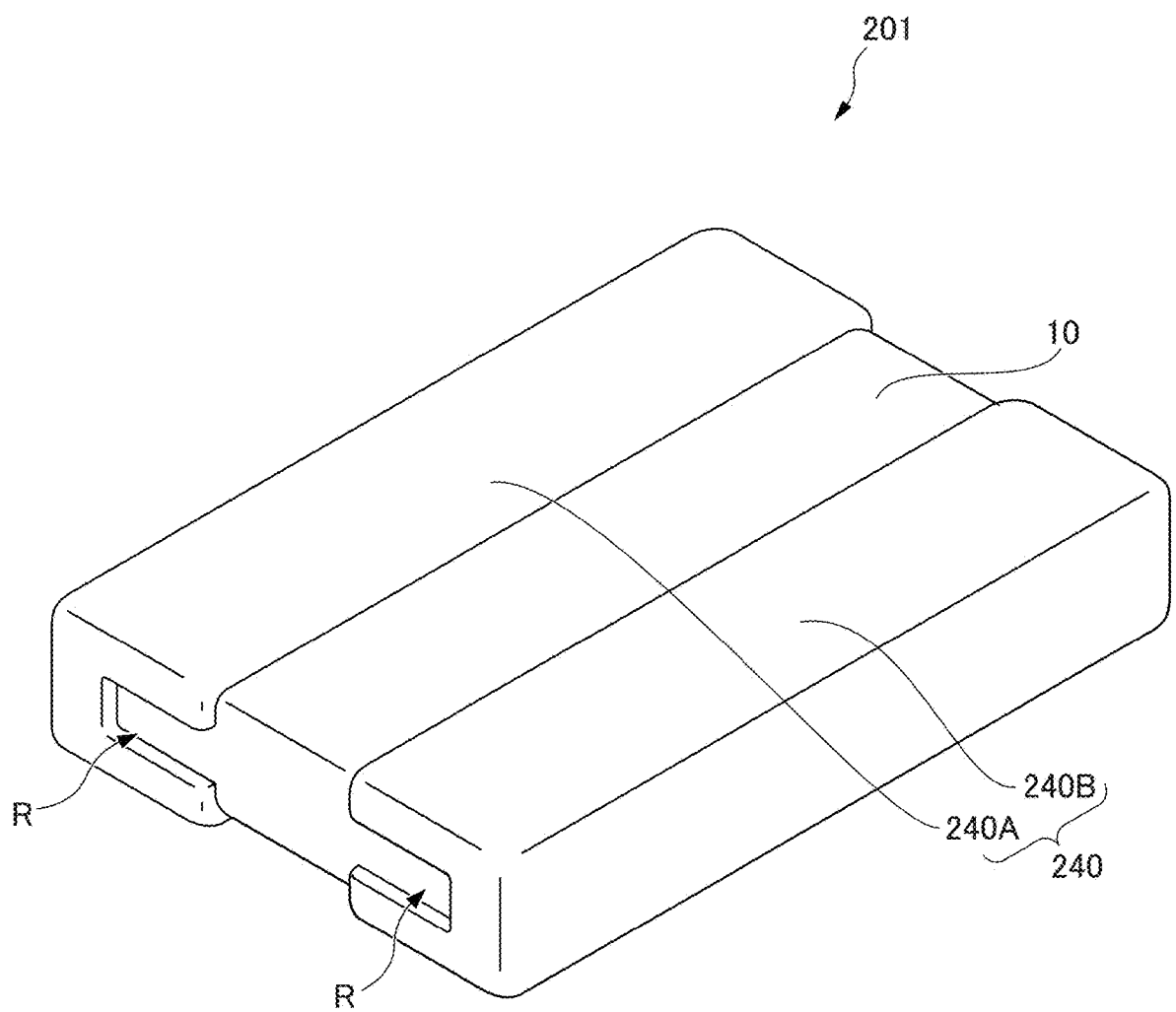

MULTILAYER CERAMIC CAPACITOR

CROSS REFERENCE TO RELATED APPLICATIONS

This application is based on and claims the benefit of priority from Japanese Patent Application No. 2021-186327, filed on Nov. 16, 2021, the entire contents of which are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors are known. A typical multilayer ceramic capacitor has a rectangular parallelepiped-shaped multilayer body with a dimension in the length direction L that is longer than the dimension in the width direction W. External electrodes are provided at both ends of the multilayer body in the length direction L. On the other hand, in order to reduce the equivalent series inductance (ESL), a so-called LW reversed type multilayer ceramic capacitor is known in which the relationship in dimension between the length direction L and the width direction W of the multilayer body is reversed (see Japanese Unexamined Patent Application Publication Nos. 2020-57753 and 2020-61524).

Furthermore, in recent years, as the mounting density of a board increases, the mounting area in a multilayer ceramic capacitor decreases. Therefore, the mounting form of Package on Package (PoP) has been adopted, and the demand for the Land Side Capacitor (LSC) type-mounted multilayer ceramic capacitor on the lower end portion of the board has been increasing. As a multilayer ceramic capacitor mounted in the LSC type, a thin multilayer ceramic capacitor having a reduced height in the height direction is required.

Japanese Unexamined Patent Application Publication No. 2020-61524 discloses an LW reversed type multilayer ceramic electronic component. In the LW reversed type multilayer ceramic electronic component, at least one edge of the fourth surface portion and the fifth surface portion of an external electrode has a recess portion recessed from the edge toward the first surface portion, and both lateral portions of the recess portion in the third direction function as a covering portion covering the ridges of the two surfaces in the second direction of the component body.

However, in the multilayer ceramic electronic component disclosed in Japanese Unexamined Patent Application Publication No. 2020-61524, it is presumed that, due to the formation position, thickness variation, etc. of a base conductor layer and a covering conductor layer provided on the base conductor layer, the area and the shape of the covering portion covering the ridges of the two surfaces in the second direction of the component body vary. Here, when mounting an LW reversed type multilayer ceramic electronic component using solder on the mounting board, depending on the lateral differences in the area and shape of the covering portion, the wetting manner of the solder with respect to the coating portion is changed on each surface, and there is a possibility that a difference occurs in the addition of the tensile stress of the solder. This may deteriorate the self-alignment effect. As a result, the multilayer ceramic electronic component may tend to rotate or tilt, which may deteriorate the mountability. Furthermore, the lands of the board on which an LW reversed type multilayer ceramic electronic component is mounted have short distances therebetween. Therefore, there is a possibility that the self-alignment effect is deteriorated. When the multilayer ceramic electronic component is greatly rotated, one external electrode is mounted in a manner straddling the lands of different polarity, and there is a possibility that a short-circuit failure occurs.

SUMMARY OF THE INVENTION

Preferred embodiments of the present invention provide LW reversed type multilayer ceramic capacitors that are each able to reduce or prevent occurrence of short circuit failure.

A multilayer ceramic capacitor according to a preferred embodiment of the present invention includes a multilayer body including a plurality of laminated dielectric layers and a plurality of internal electrode layers laminated on the dielectric layers, the multilayer body further including a first main surface and a second main surface which oppose each other in a height direction, a first end surface and a second end surface which oppose each other in a length direction perpendicular or substantially perpendicular to the height direction, and a first lateral surface and a second lateral surface which oppose each other in a width direction perpendicular or substantially perpendicular to the height direction and the length direction, a first external electrode including a first surface portion located on the first end surface, at least one selected from a second surface portion located on a portion of the first main surface and a third surface portion located on a portion of the second main surface, a fourth surface portion located on a portion of the first lateral surface, and a fifth surface portion located on a portion of the second lateral surface, and a second external electrode including a sixth surface portion located on the second end surface, at least one selected from a seventh surface portion located on a portion of the first main surface and an eighth surface portion located on a portion of the second main surface, a ninth surface portion located on a portion of the first lateral surface, and a tenth surface portion located on a portion of the second lateral surface. In a case in which a dimension in the length direction between the first end surface and the second end surface of the multilayer body is defined as l, a dimension in the width direction between the first lateral surface and the second lateral surface of the multilayer body is defined as w, and a dimension in the height direction between the first main surface and the second main surface of the multilayer body is defined as t, a dimensional relationship of w>l>t is established. In a case in which the first external electrode includes the second surface portion, a dimension in the width direction of the second surface portion is smaller than a dimension in the width direction of the first surface portion, in a case in which the first external electrode includes the third surface portion, a dimension in the width direction of the third surface portion is smaller than a dimension in the width direction of the first surface portion. In a case in which the second external electrode includes the seventh surface portion, a dimension in the width direction of the seventh surface portion is smaller than a dimension in the width direction of the sixth surface portion. In a case in which the second external electrode includes the eighth surface portion, a dimension in the width direction of the eighth surface portion is smaller than a dimension in the width direction of the sixth surface portion, dimensions of the fourth surface portion and the fifth surface portion of the first external electrode in the height direction are smaller than a dimension of the first surface portion in the height direction, and dimensions of the ninth surface portion and the tenth surface portion of the second external electrode in the height direction are smaller than a dimension of the sixth surface portion in the height direction.

According to preferred embodiments of the present invention, it is possible to provide LW reversed type multilayer ceramic capacitors that are each able to reduce or prevent occurrence of short circuit failure.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15C is an external perspective view of the second modified example as viewed from another angle.

FIG. 17A is an external perspective view of a multilayer ceramic capacitor of Comparative Example 2, and is a view corresponding to FIG. 1.

DETAILED DESCRIPTION OF THE PREFERRED EMBODIMENTS

Figure 1:
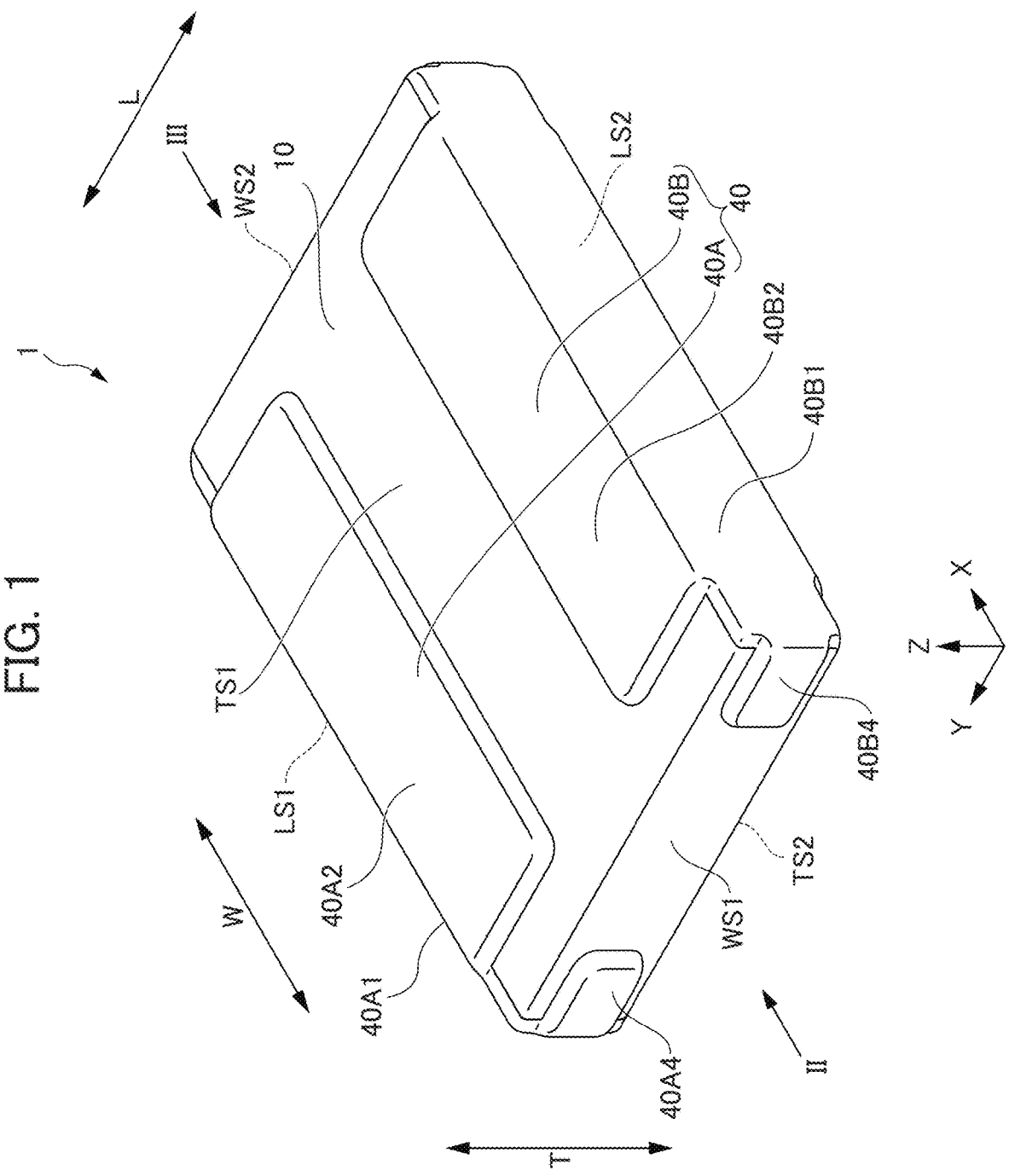
FIG. 1 is an external perspective view of a multilayer ceramic capacitor according to a preferred embodiment of the present invention.
Figure 2:
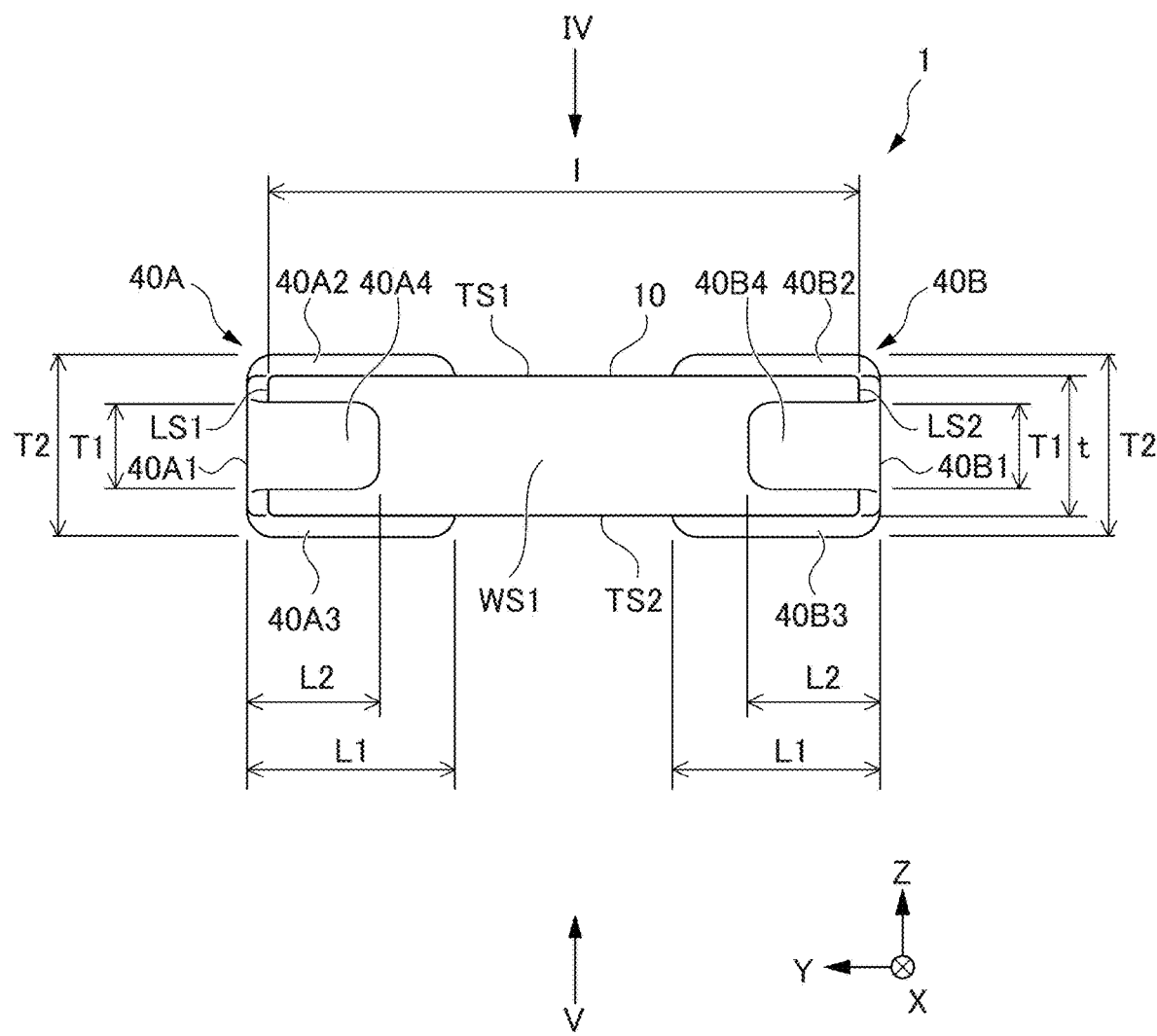
FIG. 2 is an arrow view when viewing a first lateral surface of the multilayer ceramic capacitor shown in FIG. 1 along the direction of the arrow II.
Figure 3:
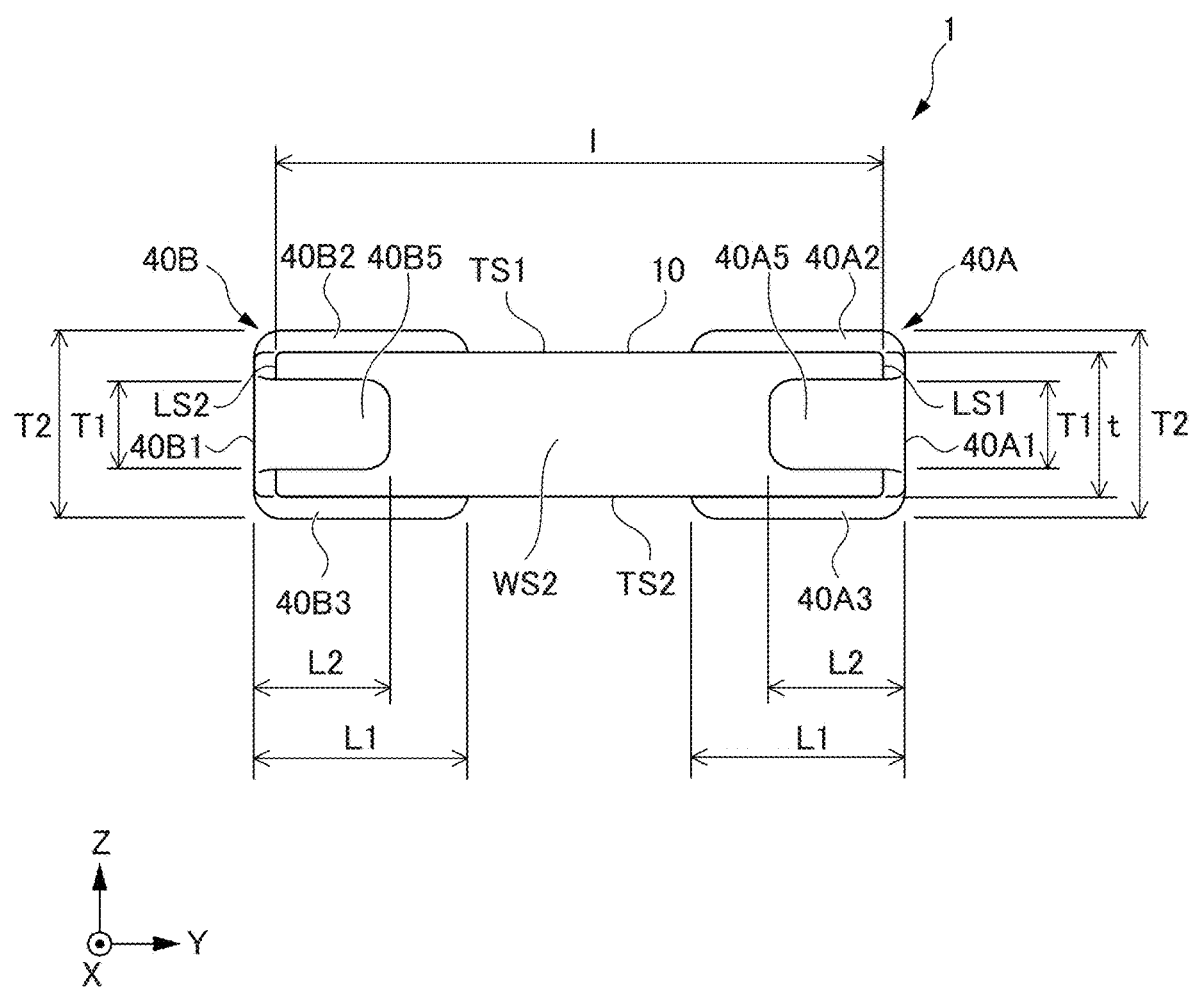
FIG. 3 is an arrow view when viewing a second lateral surface of the multilayer ceramic capacitor shown in FIG. 1 along the direction of the arrow III.
Figure 4:
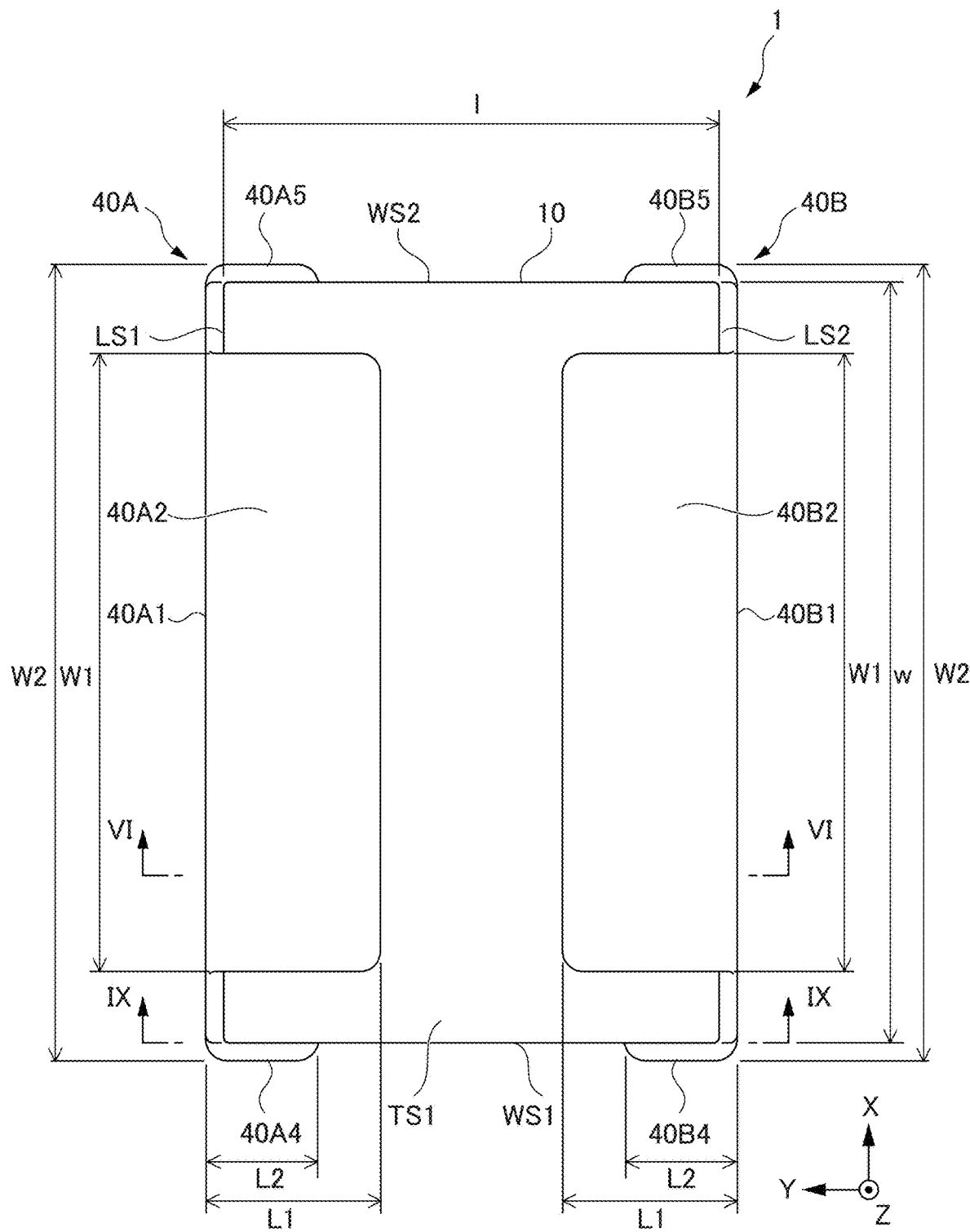
FIG. 4 is an arrow view when viewing a first main surface of the multilayer ceramic capacitor shown in FIG. 2 along the direction of the arrow IV.
Figure 5:
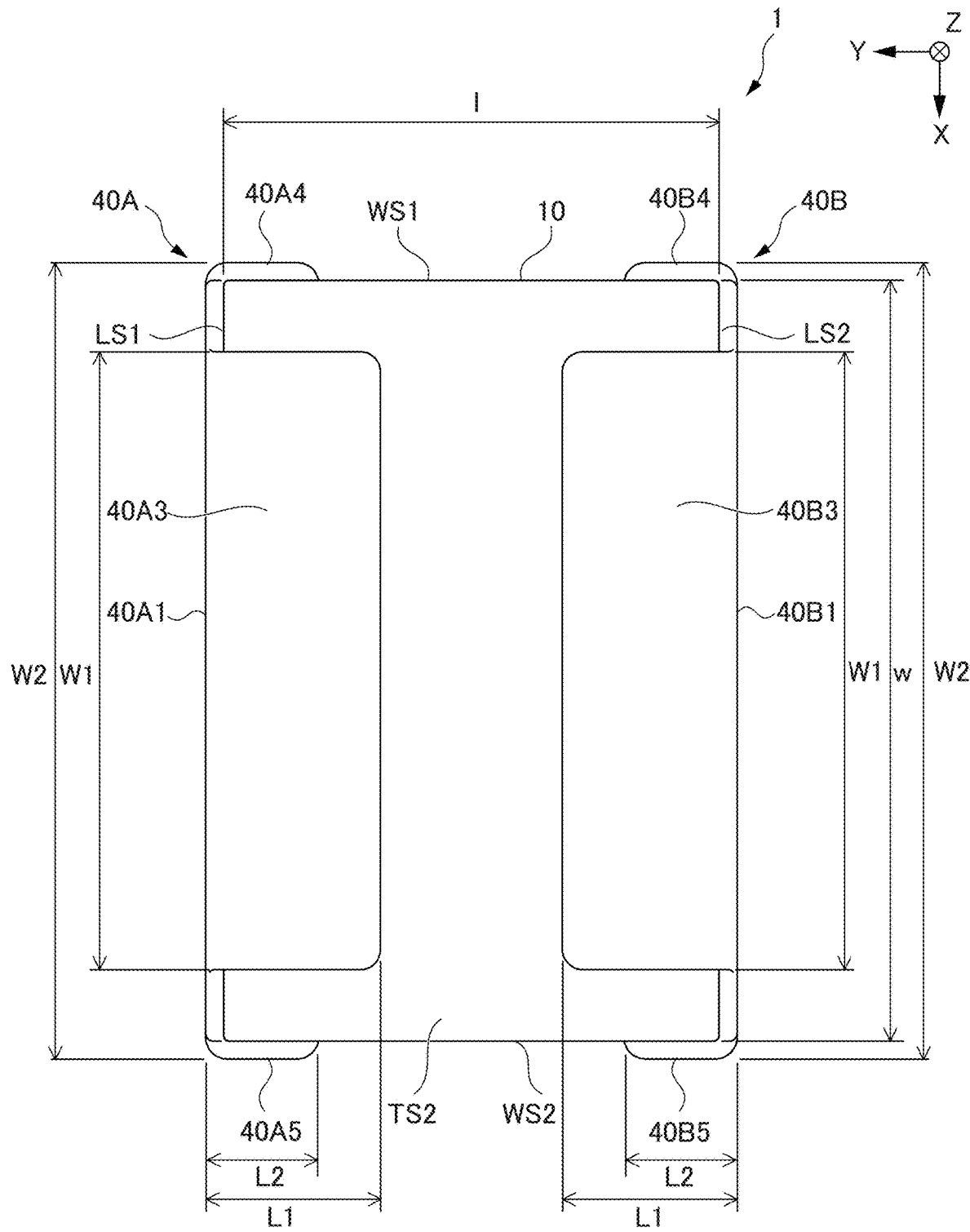
FIG. 5 is an arrow view when viewing a second main surface of the multilayer ceramic capacitor shown in FIG. 2 along the direction of the arrow V.
Figure 6:
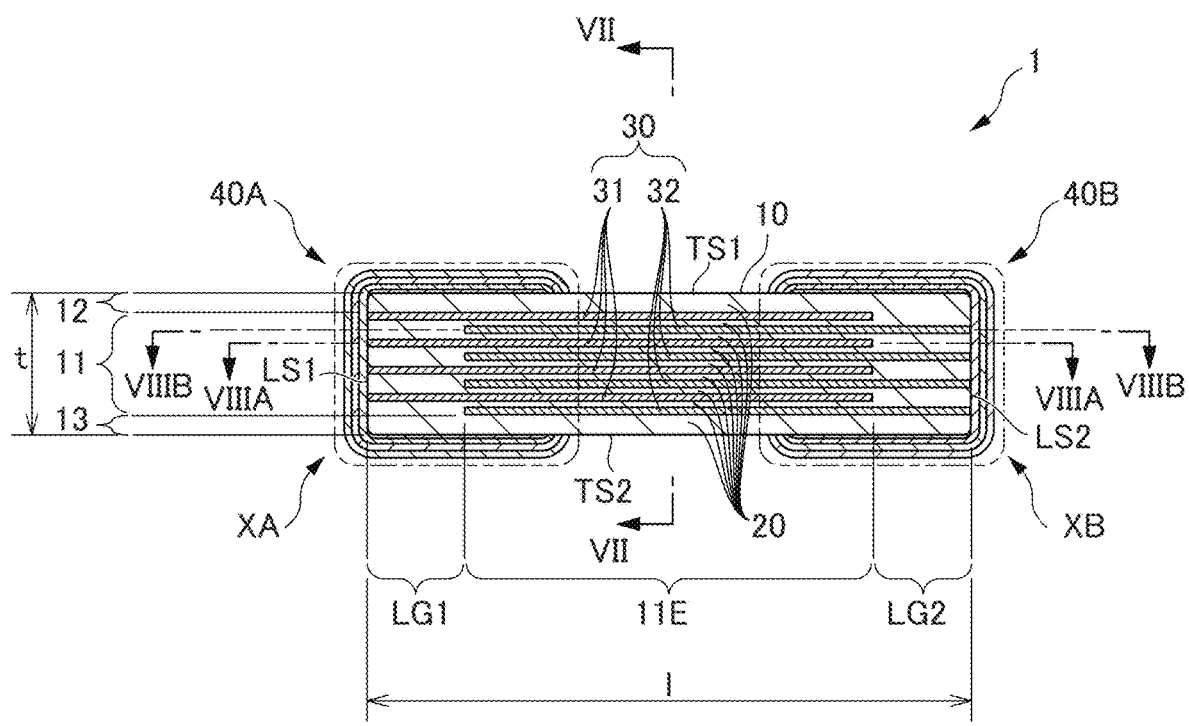
FIG. 6 is a cross-sectional view taken along the line VI-VI of the multilayer ceramic capacitor shown in FIG. 4.
Figure 6:
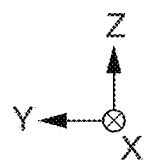
Figure 7:
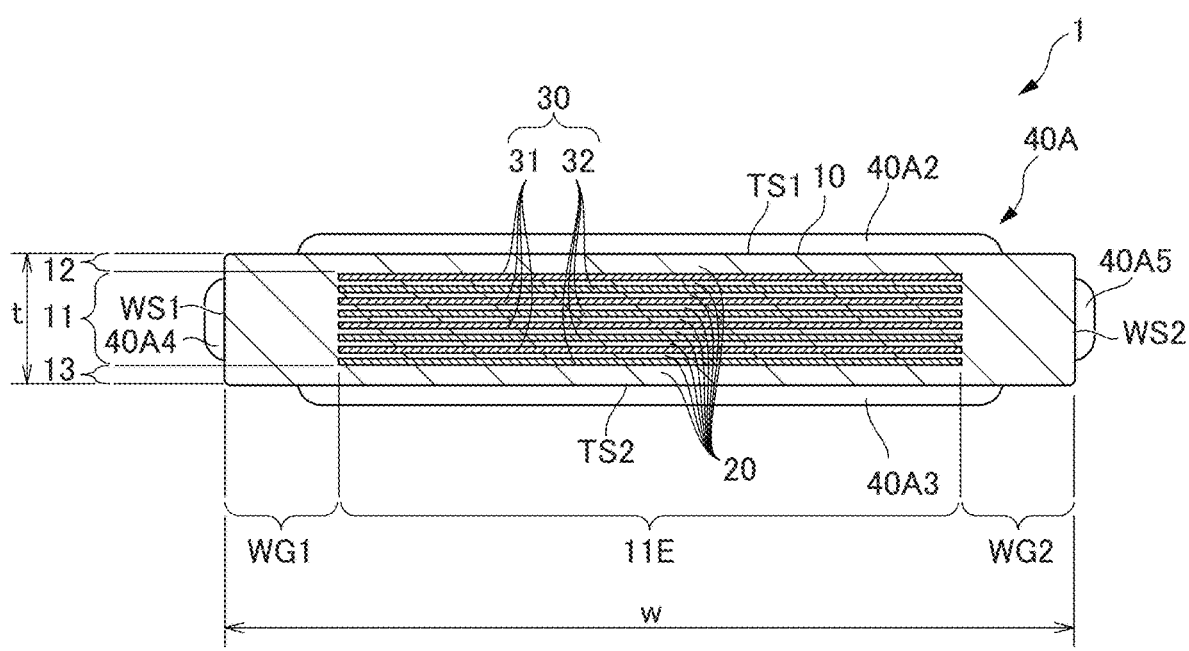
FIG. 7 is a cross-sectional view taken along the line VII-VII of the multilayer ceramic capacitor shown in FIG. 6.
Figure 8A:
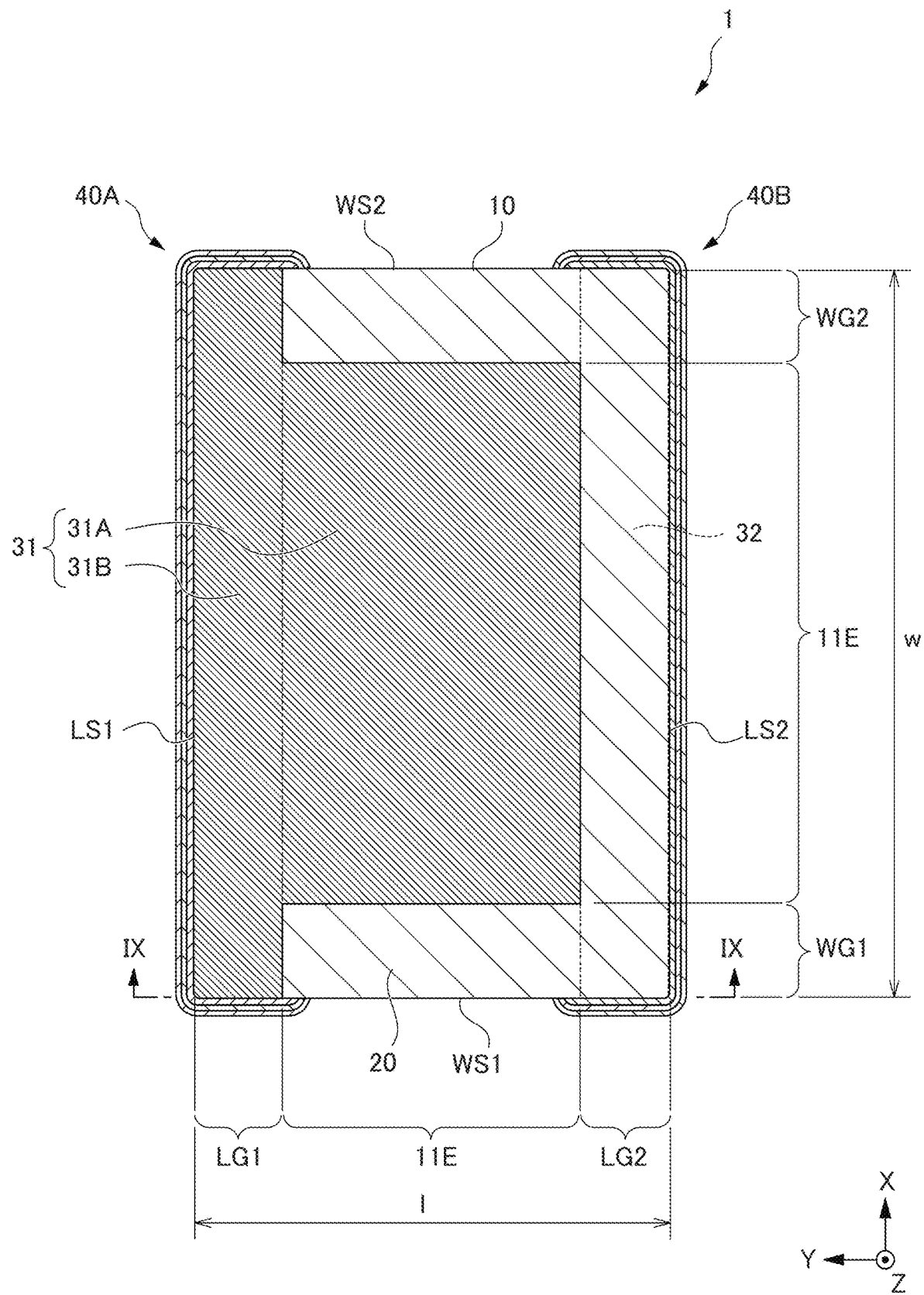
FIG. 8A is a cross-sectional view taken along the line VIIIA-VIIIA of the multilayer ceramic capacitor shown in FIG. 6, and shows a first internal electrode layer.
Figure 8B:
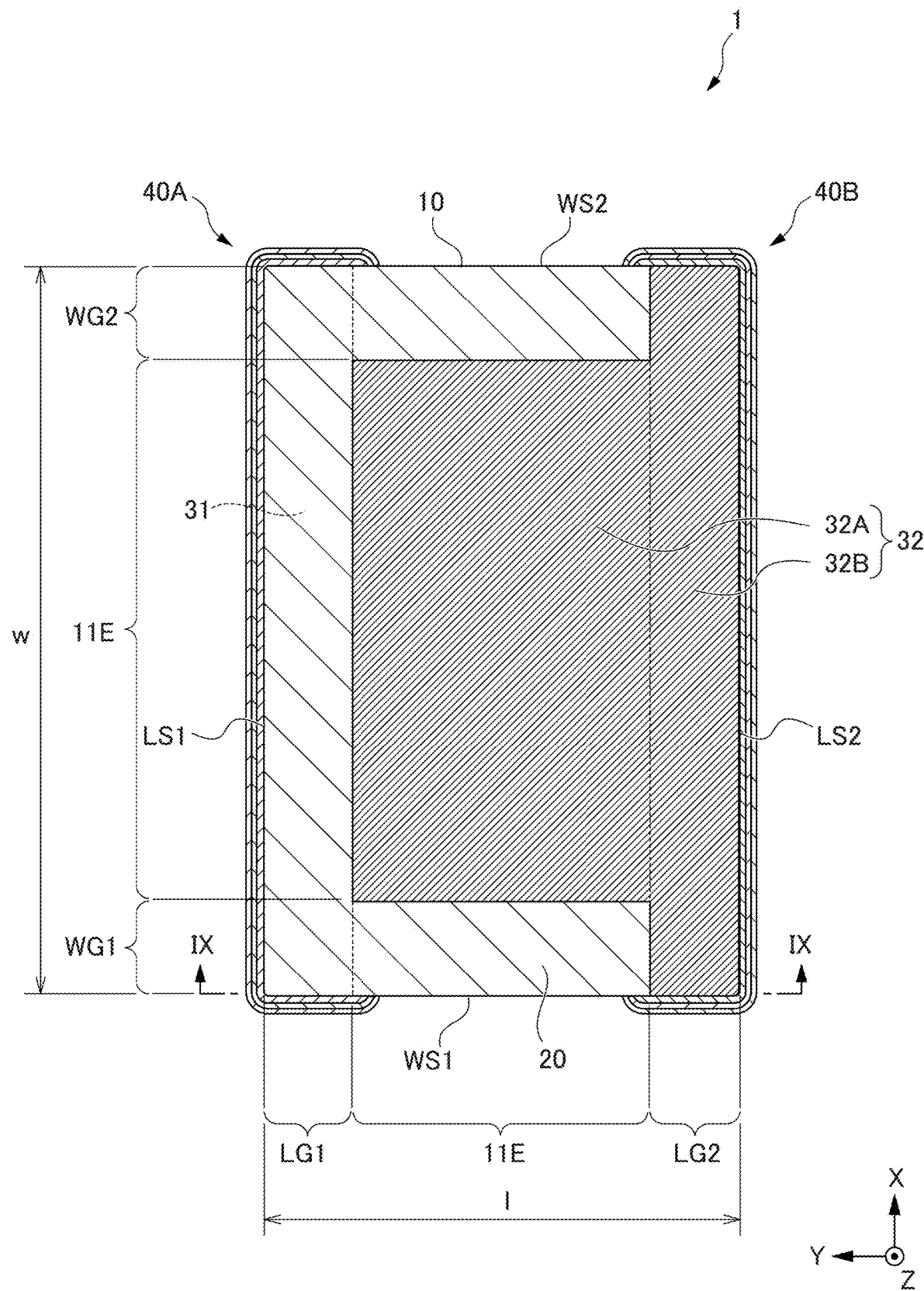
FIG. 8B is a cross-sectional view taken along the line VIIIB-VIIIB of the multilayer ceramic capacitor shown in FIG. 6, and shows a second internal electrode layer.
Figure 9:
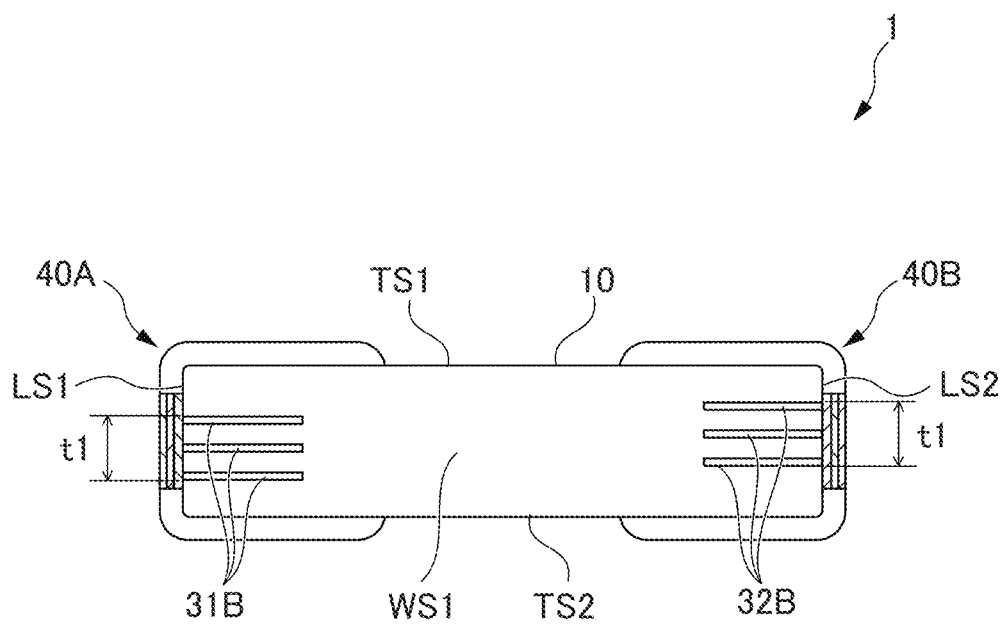
FIG. 9 is a cross-sectional view taken along the line IX-IX of the multilayer ceramic capacitor shown in FIG. 4, and shows a first lateral surface of the multilayer body.
Figure 10A:
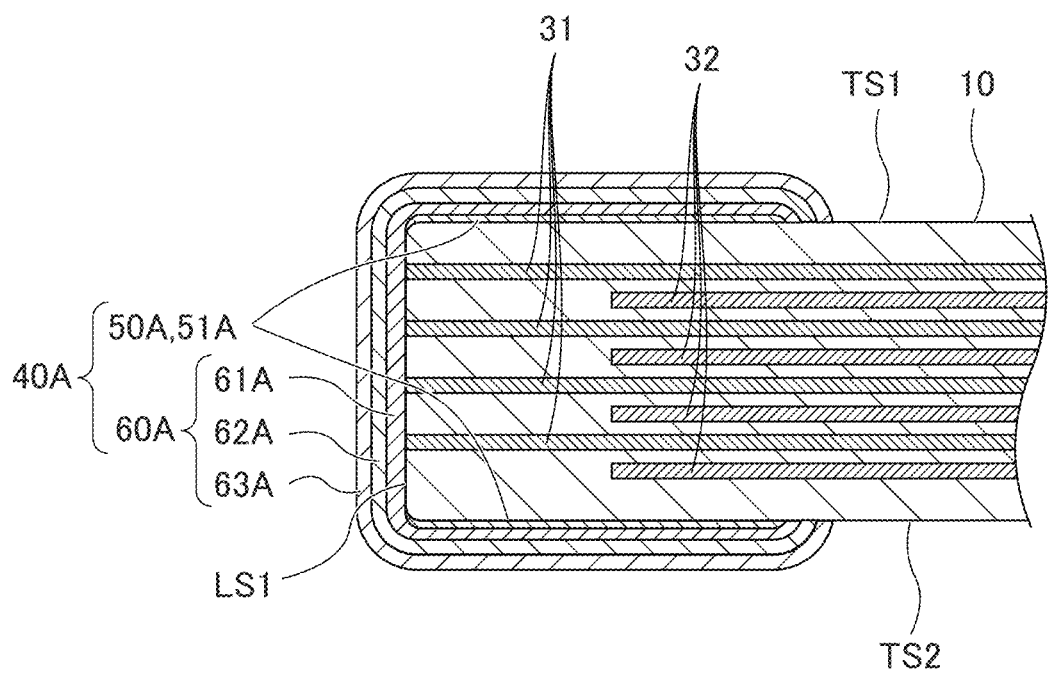
FIG. 10A is an enlarged view of an XA portion in FIG. 6, and shows a cross section of a first external electrode according to a preferred embodiment of the present invention.
Figure 10B:
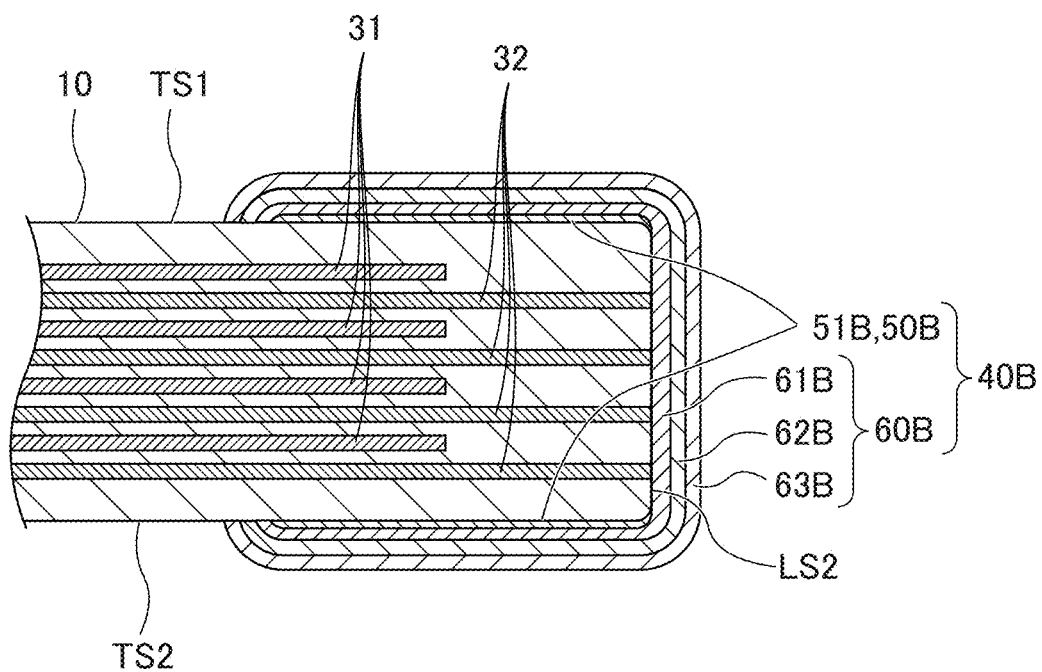
FIG. 10B is an enlarged view of a portion XB in FIG. 6, and shows a cross section of a second external electrode.

Hereinafter, a multilayer ceramic capacitor 1 according to a preferred embodiment of the present invention will be described with reference to the drawings. However, the present invention is not limited to the following preferred embodiments, and can be applied by modifying where appropriate within a scope not changing the gist of the present invention. Preferred embodiments of the present invention also include combinations of two or more of the individual preferred embodiments described below. FIG. 1 is an external perspective view of the multilayer ceramic capacitor 1 according to a preferred embodiment of the present invention. FIG. 2 is an arrow view when viewing a first lateral surface WS1 of the multilayer ceramic capacitor 1 shown in FIG. 1 along the direction of the arrow II. FIG. 3 is an arrow view when viewing a second lateral surface WS2 of the multilayer ceramic capacitor 1 shown in FIG. 1 along the direction of the arrow III. FIG. 4 is an arrow view when viewing a first main surface TS1 of the multilayer ceramic capacitor 1 shown in FIG. 2 along the direction of the arrow IV. FIG. 5 is an arrow view when viewing a second main surface TS2 of the multilayer ceramic capacitor 1 shown in FIG. 2 along the direction of the arrow V. FIG. 6 is a cross-sectional view taken along the line VI-VI of the multilayer ceramic capacitor 1 shown in FIG. 4. FIG. 7 is a cross-sectional view taken along the line VII-VII of the multilayer ceramic capacitor 1 shown in FIG. 6. FIG. 8A is a cross-sectional view taken along the line VIIIA-VIIIA of the multilayer ceramic capacitor 1 shown in FIG. 6. FIG. 8B is a cross-sectional view taken along the line VIIIB-VIIIB of the multilayer ceramic capacitor 1 shown in FIG. 6. FIG. 9 is a cross-sectional view taken along the line IX-IX of the multilayer ceramic capacitor shown in FIG. 4, and shows the first lateral surface WS1 of the multilayer body 10. FIG. 10A is an enlarged view of an XA portion in FIG. 6, and shows a cross section of a first external electrode 40A. FIG. 10B is an enlarged view of an XB portion in FIG. 6, and shows a cross section of a second external electrode 40B.

The multilayer ceramic capacitor 1 includes a multilayer body 10 and external electrodes 40.

FIGS. 1 to 9 each show an XYZ Cartesian coordinate system. The length direction L of the multilayer ceramic capacitor 1 and the multilayer body 10 corresponds to the Y-direction. The width direction W of the multilayer ceramic capacitor 1 and the multilayer body 10 corresponds to the X-direction. The height (lamination) direction T of the multilayer ceramic capacitor 1 and multilayer body 10 corresponds to the Z-direction. The cross section shown in FIG. 6 is also referred to as an LT cross section. The cross section shown in FIG. 7 is also referred to as a WT cross section. The cross-sections shown in FIGS. 8A and 8B are also referred to as an LW cross section.

As shown in FIGS. 1 to 5, the multilayer body 10 includes a first main surface TS1 and a second main surface TS2 opposing in the height direction T, a first end surface LS1 and a second end surface LS2 opposing in the length direction L orthogonal or substantially orthogonal to the height direction T, and a first lateral surface WS1 and a second lateral surface WS2 opposing in the width direction W orthogonal or substantially orthogonal to the height direction T and the length direction L.

The multilayer body 10 has a rectangular or substantially rectangular parallelepiped shape. It is preferable that the corners and ridges of multilayer body 10 are rounded. The corners are portions where the three surfaces of the multilayer body 10 intersect, and the ridges are portions where the two surfaces of the multilayer body 10 intersect. Irregularities or the like may be provided on a portion or all of the surface of the multilayer body 10, for example.

As shown in FIGS. 6 and 7, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30. The inner layer portion 11 includes the internal electrode layers 30 from the internal electrode layer 30 located the most to the first main surface TS1 side to the internal electrode layer 30 located the most to the second main surface TS2 side in the height direction T. In the inner layer portion 11, the plurality of internal electrode layers 30 are opposed to each other with a dielectric layer 20 interposed therebetween. The inner layer portion 11 generates capacitance, and is defined as and substantially functions as a capacitor. The inner layer portion 11 is also referred to as an active layer portion. The plurality of dielectric layers 20 includes a dielectric material. The dielectric material is a ceramic material, for example. The dielectric material may be a dielectric ceramic including components such as, for example, $BaTiO_3$, $CaTiO_3$, $SrTiO_3$ or $CaZrO_3$. When these components are the main components, sub-components of a content smaller than that of the main components, such as, for example, a Mn compound, an Fe compound, a Cr compound, a Co compound, and a Ni compound, may be added depending on the characteristics of a desired multilayer body.

The thickness of the dielectric layer 20 is preferably about 0.5 μm or more and about 10 μm or less, for example. The number of dielectric layers 20 to be laminated is preferably 15 or more and 700 or less, for example. The number of the dielectric layers 20 is the total number of dielectric layers in the inner layer portion 11 and the number of dielectric layers in the first main surface-side outer layer portion 12 and the second main surface-side outer layer portion 13.

The internal electrode layers 30 include a plurality of first internal electrode layers 31 and a plurality of second internal electrode layers 32. The first internal electrode layers 31 are provided on the dielectric layers 20 and extend to the first end surface LS1. The second internal electrode layers 32 are provided on the dielectric layers 20 and extend to the second end surface LS2. The first internal electrode layers 31 and the second internal electrode layers 32 are alternately provided in the height direction T of the multilayer body 10 with the dielectric layer 20 interposed therebetween. The first internal electrode layer 31 and the second internal electrode layer 32 are arranged to sandwich the dielectric layer 20.

As shown in FIG. 8A, the first internal electrode layer 31 includes a first counter electrode portion 31A opposed to the second internal electrode layer 32, and a first extension portion 31B that extends from the first counter electrode portion 31A to the first end surface LS1, a portion of the first lateral surface WS1, and a portion of the second lateral surface WS2.

The first counter electrode portion 31A is located inside the multilayer body 10. The first extension portion 31B is connected to the first counter electrode portion 31A, and exposed at the first end surface LS1, a portion of the first lateral surface WS1, and a portion of the second lateral surface WS2.

As shown in FIG. 8B, the second internal electrode layer 32 preferably includes a second counter electrode portion 32A opposed to the first internal electrode layer 31, and a second extension portion 32B that extends from the second counter electrode portion 32A to the second end surface LS2, a portion of the first lateral surface WS1, and a portion of the second lateral surface WS2.

The second counter electrode portion 32A is located inside the multilayer body 10. The second extension portion 32B is connected to the second counter electrode portion 32A, and exposed at the second end surface LS2, a portion of the first lateral surface WS1, and a portion of the second lateral surface WS2.

FIG. 9 is a cross-sectional view taken along the line IX-IX of the multilayer ceramic capacitor 1 shown in FIG. 4, and shows the first lateral surface WS1 of the multilayer body 10. Also in FIGS. 8A and 8B, the line IX-IX showing the location of the cross-sectional view of FIG. 9 is shown. As shown in FIG. 9, the first extension portion 31B of the first internal electrode layer 31 and the second extension portion 32B of the second internal electrode layer 32 are exposed on the first lateral surface WS1 of the multilayer body 10.

Although not shown, the first extension portion 31B of the first internal electrode layer 31 and the second extension portion 32B of the second internal electrode layer 32 are exposed on the second lateral surface WS2 side, similarly to the first lateral surface WS1 side.

With such a configuration, it is possible to shorten the distance between the first extension portion 31B of the first internal electrode layer 31 and the second extension portion 32B of the second internal electrode layer 32. This configuration makes it possible to shorten the path through which current flows. With such a configuration, it is possible to reduce the ESL.

In a preferred embodiment of the present invention, the first counter electrode portion 31A and the second counter electrode portion 32A are opposed to each other with the dielectric layer 20 interposed therebetween, such that a capacitance is generated and a capacitor is defined.

The shapes of the first counter electrode portion 31A and the second counter electrode portion 32A are not particularly limited. However, they are preferably rectangular or substantially rectangular. However, the corners of the rectangular or substantially rectangular shape may be rounded or slanted.

The shapes of the first extension portion 31B and the second extension portion 32B are not particularly limited. However, they are preferably rectangular or substantially rectangular. However, the corners of the rectangular or substantially rectangular shape may be rounded or slanted.

The dimension of the first extension portion 31B in the width direction W is larger than the dimension of the first counter electrode portion 31A in the width direction. The dimension of the second extension portion 32B in the width direction W is larger than the dimension of the second counter electrode portion 32A in the width direction.

Each of the first extension portion 31B and the second extension portion 32B includes a portion exposed at a portion of the first lateral surface WS1. The dimension in the length direction L of the portion exposed at a portion of the first lateral surface WS1 is preferably, for example, about 20 μm or more and about 280 μm or less. Each of the first extension portion 31B and the second extension portion 32B includes a portion exposed at a portion of the second lateral surface WS2. The dimension in the length direction L of the portion exposed at a portion of the second lateral surface WS2 is preferably, for example, about 20 μm or more and about 280 μm or less.

The first internal electrode layers 31 may all have the same shape, or each of them may have a partially different shape. For example, among the first internal electrode layers 31, the first internal electrode layers 31 provided adjacent to the center in the height direction T may have the shape as shown in FIG. 8A and may be exposed at the first lateral surface WS1 and the second lateral surface WS2, while portions of the first internal electrode layers 31 provided adjacent to the first main surface-side outer layer portion 12 and the second main surface-side outer layer portion 13 may not be exposed at the first lateral surface WS1 and the second lateral surface WS2. For example, the internal electrode layers each may have the shape as shown in FIG. 16B described later.

The second internal electrode layers 32 may all have the same shape, or each of them may have a partly different shape. For example, among the second internal electrode layers 32, the second internal electrode layers 32 provided adjacent to the center in the height direction T may have the shape as shown in FIG. 8B and are exposed at the first lateral surface WS1 and the second lateral surface WS2, while portions of the second internal electrode layers 32 provided adjacent to the first main surface-side outer layer portion 12 and the second main surface-side outer layer portion 13 may not be exposed at the first lateral surface WS1 and the second lateral surface WS2. For example, the internal electrode layer each may have the shape as shown in FIG. 16C described later.

With such a configuration, it is possible to adjust the range in the height direction T provided by the first extension portions 31B exposed at a portion of the first lateral surface WS1 (refer to t1 in FIG. 9) and the range in the height direction T provided by the first extension portions 31B exposed at a portion of the second lateral surface WS2. Furthermore, it is also possible to adjust the range in the height direction T provided by the second extension portions 32B exposed at a portion of the first lateral surface WS1 (refer to t1 in FIG. 9) and the range in the height direction T provided by the second extension portions 32B exposed at a portion of the second lateral surface WS2. As a result, it is possible to adjust the dimension T1 in the height direction T of each of a fourth surface portion 40A4 and a fifth surface portion 40A5 of the first external electrode 40A, which will be described later, and the dimension T1 in the height direction T of a ninth surface portion 40B4 and a tenth surface portion 40B5 of the second external electrode 40B.

The first internal electrode layer 31 and the second internal electrode layer 32 are each made of an appropriate conductive material including a metal such as, for example, Ni, Cu, Ag, Pd, and Au, and an alloy including at least one selected from these metals. When an alloy is used, the first internal electrode layer 31 and the second internal electrode layer 32 may be made of, for example, a Ag—Pd alloy.

The thickness of each of the first internal electrode layers 31 and the second internal electrode layers 32 is preferably, for example, about 0.2 μm or more and about 2.0 μm or less. The total number of the first internal electrode layers 31 and the second internal electrode layers 32 is preferably, for example, 15 or more and 200 or less.

The first main surface-side outer layer portion 12 is located on the first main surface TS1 side of the multilayer body 10. The first main surface-side outer layer portion 12 is an assembly of dielectric layers 20 located between the first main surface TS1 and the internal electrode layer 30 closest to the first main surface TS1. In other words, the first main surface-side outer layer portion 12 includes dielectric layers 20 located between the first main surface TS1 and the internal electrode layer 30 located closest to the first main surface TS1 side among the internal electrode layers 30. The dielectric layers 20 used in the first main surface-side outer layer portion 12 may be the same as the dielectric layers 20 used in the inner layer portion 11.

The second main surface-side outer layer portion 13 is located on the second main surface TS2 side of the multilayer body 10. The second main surface-side outer layer portion 13 is an assembly of dielectric layers 20 located between the second main surface TS2 and the internal electrode layer 30 closest to the second main surface TS2. In other words, the second main surface-side outer layer portion 13 includes dielectric layers 20 located between the second main surface TS2 and the internal electrode layer 30 located closest to the second main surface TS2 side among the internal electrode layers 30. The dielectric layers 20 used in the second main surface-side outer layer portion 13 may preferably be the same as the dielectric layers 20 used in the inner layer portion 11.

As described above, the multilayer body 10 includes a plurality of dielectric layers 20 and a plurality of internal electrode layers 30 laminated on dielectric layers 20. That is, the multilayer ceramic capacitor 1 includes the multilayer body 10 including the dielectric layers 20 and the internal electrode layers 30 alternately laminated therein.

The multilayer body 10 includes a counter electrode portion 11E. The counter electrode portion 11E refers to a portion where the first counter electrode portion 31A of the first internal electrode layer 31 and the second counter electrode portion 32A of the second internal electrode layer 32 are opposed to each other. The counter electrode portion 11E defines and functions as a portion of the inner layer portion 11. FIGS. 8A and 8B each show the ranges of the width direction W and the length direction L of the counter electrode portion 11E. The counter electrode portion 11E is also referred to as a capacitor active portion.

The multilayer body 10 includes an end surface-side outer layer portion. The end surface-side outer layer portion includes a first end surface-side outer layer portion LG1 located on the first end surface LS1 side and a second end surface-side outer layer portion LG2 located on the second end surface LS2 side. The first end surface-side outer layer portion LG1 includes the dielectric layers 20 and the first extension portion 31B located between the counter electrode portion 11E and the first end surface LS1. That is, the first end surface-side outer layer portion LG1 is an assembly of portions on the first end surface LS1 side of the dielectric layers 20, and the first extension portions 31B. The second end surface-side outer layer portion LG2 includes the dielectric layers 20 and the second extension portions 32B located between the counter electrode portion 11E and the second end surface LS2. That is, the second end surface-side outer layer portion LG2 is an assembly of portions on the second end surface LS2 side of the dielectric layers 20, and the second extension portions 32B. FIGS. 6, 8A, and 8B each show the ranges in the length direction L of the first end surface-side outer layer portion LG1 and the second end surface-side outer layer portion LG2. The first end surface-side outer layer portion LG1 and the second end surface-side outer layer portion LG2 are also referred to as L gaps or end gaps.

The multilayer body 10 includes a lateral surface-side outer layer portion. The lateral surface-side outer layer portion includes a first lateral surface-side outer layer portion WG1 located on the first lateral surface WS1 side and a second lateral surface-side outer layer portion WG2 located on the second lateral surface WS2 side. The first lateral surface-side outer layer portion WG1 includes the dielectric layers 20 located between the counter electrode portion 11E and the first lateral surface WS1. That is, the first lateral surface-side outer layer portion WG1 is an assembly of portions on the first lateral surface WS1 side of the dielectric layers 20. The second lateral surface-side outer layer portion WG2 includes the dielectric layers 20 located between the counter electrode portion 11E and the second lateral surface WS2. That is, the second lateral surface-side outer layer portion WG2 is an assembly of portions on the second lateral surface WS2 side of the dielectric layers 20. FIGS. 7, 8A, and 8B each show the ranges in the width direction W of the first lateral surface-side outer layer portion WG1 and the second lateral surface-side outer layer portion WG2. The first lateral surface-side outer layer portion WG1 and the second lateral surface-side outer layer portion WG2 are also referred to as W gaps or side gaps.

As shown in FIGS. 6 to 8B, in the multilayer body 10, when the dimension in the length direction L from the first end surface LS1 to the second end surface LS2 is defined as l, the dimension in the width direction W from the first lateral surface WS1 to the second lateral surface WS2 is defined as w, and the dimension in the height direction T from the first main surface TS1 to the second main surface TS2 is defined as t, their dimensional relationship is established as w>l>t, for example. With such a configuration, it is possible to widen the widths of the extension portions at the end surfaces of the internal electrode layers 30. In addition, since it is possible to shorten the distance between the first external electrode 40A and the second external electrode 40B, which will be described later, it is possible to reduce the ESL of the multilayer ceramic capacitor 1.

The dimension l in the length direction L from the first end surface LS1 to the second end surface LS2 of the multilayer body 10 is preferably, for example, about 0.05 mm or more and about 0.7 mm or less. The dimension w in the width direction W from the first lateral surface WS1 to the second lateral surface WS2 of the multilayer body 10 is preferably, for example, about 0.15 mm or more and about 1.5 mm or less. Furthermore, it is preferable that the dimension t in the height direction T from the first main surface TS1 to the second main surface TS2 of the multilayer body 10 is, for example, about 150 μm or less. Such a configuration enables high-density mounting. Furthermore, the dimension t in the height direction T from the first main surface TS1 to the second main surface TS2 of the multilayer body 10 is preferably, for example, about 100 μm or less, and more preferably about 50 μm or less. Such a configuration enables higher density mounting.

The respective dimensions of l, w, and t of the multilayer body 10 are measured, for example, by the following methods.

First, the dimension w of the multilayer body 10 is measured. More specifically, the dimension w of the multilayer body 10 is measured by a micrometer at the middle position in the length direction L of the multilayer ceramic capacitor 1, i.e., at the L/2 position of the multilayer ceramic capacitor 1.

Next, the dimensions l and t of the multilayer body 10 are measured. First, the same multilayer ceramic capacitor 1 as the multilayer ceramic capacitor 1 for which the dimension w was measured is polished so as to be parallel to the LT plane up to the middle position in the width direction W of the multilayer ceramic capacitor 1, i.e., up to the W/2 position of the multilayer ceramic capacitor 1. Then, the LT cross section exposed by polishing is observed by microscope. The dimension l of the multilayer body 10 is measured by microscope at the middle position in the LT cross section in the height direction T of the multilayer body 10, i.e., at the t/2 position of the multilayer body 10. The dimension t of the multilayer body 10 is measured by microscope at the middle position in the LT cross section in the length direction L of the multilayer body 10, i.e., at the ½ position of the multilayer body 10.

The external electrode 40 includes a first external electrode 40A provided on the first end surface LS1 side and a second external electrode 40B provided on the second end surface LS2 side.

The first external electrode 40A is connected to the first internal electrode layers 31. The first external electrode 40A of a preferred embodiment of the present invention preferably includes a first surface portion 40A1 located on the first end surface LS1, a second surface portion 40A2 located on a portion of the first main surface TS1, a third surface portion 40A3 located on a portion of the second main surface TS2, a fourth surface portion 40A4 located on a portion of the first lateral surface WS1, and a fifth surface portion 40A5 located on a portion of the second lateral surface WS2. The first external electrode 40A preferably includes at least either one of the second surface portion 40A2 located on a portion of the first main surface TS1 and the third surface portion 40A3 located on a portion of the second main surface TS2, the first surface portion 40A1 located on a portion of the first end surface LS1, the fourth surface portion 40A4 located on a portion of the first lateral surface WS1, and the fifth surface portion 40A5 located on a portion of the second lateral surface WS2.

The first surface portion 40A1 covers the entire or substantially the entire first end surface LS1 and is connected to the first internal electrode layers 31. Either the second surface portion 40A2 or the third surface portion 40A3 is connected to a land of the mounting board.

The fourth surface portion 40A4 is a portion connected to the first extension portion 31B exposed at the first lateral surface WS1. The fifth surface portion 40A5 is a portion connected to the first extension portion 31B exposed at the second lateral surface WS2.

The second external electrode 40B is connected to the second internal electrode layers 32. The second external electrode 40B of a preferred embodiment of the present invention includes a sixth surface portion 40B1 located on the second end surface LS2, a seventh surface portion 40B2 located on a portion of the first main surface TS1, an eighth surface portion 40B3 located on a portion of the second main surface TS2, a ninth surface portion 40B4 located on a portion of the first lateral surface WS1, and a tenth surface portion 40B5 located on a portion of the second lateral surface WS2. The second external electrode 40B preferably includes at least either one of the seventh surface portion 40B2 located on a portion of the first main surface TS1 and the eighth surface portion 40B3 located on a portion of the second main surface TS2, the sixth surface portion 40B1 located on a portion of the second end surface LS2, the ninth surface portion 40B4 located on a portion of the first lateral surface WS1, and the tenth surface portion 40B5 located on a portion of the second lateral surface WS2.

The sixth surface portion 40B1 covers the entire second end surface LS2 and is connected to the second internal electrode layers 32. Either the seventh surface portion 40B2 or the eighth surface portion 40B3 is connected to a land of the mounting board.

The ninth surface portion 40B4 is connected to the second extension portions 32B that are exposed at the first lateral surface WS1. The tenth surface portion 40B5 is connected to the second extension portion 32B that are exposed at the second lateral surface WS2.

The dimension W1 in the width direction W of each of the second surface portion 40A2 and the third surface portion 40A3 of the first external electrode 40A is smaller than the dimension W2 in the width direction W of the first surface portion 40A1. In other words, at both ends in the width direction W of the second surface portion 40A2 and the third surface portion 40A3 of the first external electrode 40A, there exist portions where the external electrode is not provided and the surface of the multilayer body 10 is exposed. Furthermore, the dimension W1 in the width direction W of the second surface portion 40A2 and the third surface portion 40A3 of the first external electrode 40A is preferably smaller than the dimension w of the multilayer body 10 in the width direction W. With such a configuration, when the multilayer ceramic capacitor 1 is mounted on the mounting board by soldering, the solder is likely to be spread to the middle portion where the second surface portion 40A2 and the third surface portion 40A3 exist, not over the entire surface of the first surface portion 40A1 of the first external electrode 40A. Therefore, since it is possible to perform solder bonding with the middle portion in the width direction W of the multilayer ceramic capacitor 1 as a center, it is possible to stabilize the mountability of the multilayer ceramic capacitor 1. Furthermore, even if the multilayer ceramic capacitor 1 is greatly rotated on the land, since the dimension W1 in the width direction W of the second surface portion 40A2 and the third surface portion 40A3 of the first external electrode 40A is smaller than the dimension w of the multilayer body 10 in the width direction W, it is possible to prevent the multilayer ceramic capacitor 1 from being mounted in a manner straddling lands of different polarity. As a result, it is possible to prevent the occurrence of a short circuit defect.

The dimension W1 in the width direction W of each of the second surface portion 40A2 and the third surface portion 40A3 of the first external electrode 40A is preferably, for example, about 80% or more and about 95% or less of the dimension w of the multilayer body 10 in the width direction W. With such a configuration, it is possible to more effectively provide the advantageous effects of the present disclosure.

Furthermore, the dimension L1 in the length direction L of each of the second surface portion 40A2 and the third surface portion 40A3 of the first external electrode 40A is preferably, for example, about 20% or more and about 40% or less of the dimension l in the length direction L of the multilayer body 10. With such a configuration, it is possible not only to improve the stability of mounting with respect to the mounting board, but also to prevent the multilayer ceramic capacitor 1 from being mounted in a manner straddling lands of different polarity even if the multilayer ceramic capacitor 1 is greatly rotated on the land, because the dimension W1 in the width direction W of the second surface portion 40A2 and the third surface portion 40A3 of the first external electrode 40A is smaller than the dimension w of the multilayer body 10 in the width direction W. As a result, it is possible to prevent the occurrence of a short circuit defect.

The dimension W1 in the width direction W of the seventh surface portion 40B2 and the eighth surface portion 40B3 of the second external electrode 40B is smaller than the dimension W2 in the width direction W of the sixth surface portion 40B1. In other words, at both ends in the width direction W of the seventh surface portion 40B2 and the eighth surface portion 40B3 of the second external electrode 40B, there exist portions where the external electrode is not provided and the surface of the multilayer body 10 is exposed. Furthermore, the dimension W1 in the width direction W of the seventh surface portion 40B2 and the eighth surface portion 40B3 of the second external electrode 40B is preferably smaller than the dimension w of the multilayer body 10 in the width direction W. With such a configuration, when the multilayer ceramic capacitor 1 is mounted on the mounting board by soldering, the solder is likely to be spread to the middle portion where the seventh surface portion 40B2 and the eighth surface portion 40B3 exist, not over the entire surface of the sixth surface portion 40B1 of the second external electrode 40B. Therefore, since it is possible to perform solder bonding with the middle portion in the width direction W of the multilayer ceramic capacitor 1 as a center, it is possible to stabilize the mountability of the multilayer ceramic capacitor 1. Furthermore, even if the multilayer ceramic capacitor 1 is greatly rotated on the land, since the dimension W1 in the width direction W of the seventh surface portion 40B2 and the eighth surface portion 40B3 of the second external electrode 40B is smaller than the dimension w of the multilayer body 10 in the width direction W, it is possible to prevent the multilayer ceramic capacitor 1 from being mounted in a manner straddling lands of different polarity. As a result, it is possible to prevent the occurrence of a short circuit defect.

The dimension W1 in the width direction W of each of the seventh surface portion 40B2 and the eighth surface portion 40B3 of the second external electrode 40B is preferably, for example, about 80% or more and about 95% or less of the dimension w of the multilayer body 10 in the width direction W. With such a configuration, it is possible to more effectively provide the advantageous effects of the present disclosure.

Furthermore, the dimension L1 in the length direction L of each of the seventh surface portion 40B2 and the eighth surface portion 40B3 of the second external electrode 40B is preferably, for example, about 20% or more and about 40% or less of the dimension l in the length direction L of the multilayer body 10. With such a configuration, it is possible not only to improve the stability of mounting with respect to the mounting board, but also to prevent the multilayer ceramic capacitor 1 from being mounted in a manner straddling lands of different polarity even if the multilayer ceramic capacitor 1 is greatly rotated on the land, because the dimension W1 in the width direction W of the seventh surface portion 40B2 and the eighth surface portion 40B3 of the second external electrode 40B is smaller than the dimension w of the multilayer body 10 in the width direction W. As a result, it is possible to prevent the occurrence of a short circuit defect.

The dimension T1 in the height direction T of the fourth surface portion 40A4 and the fifth surface portion 40A5 of the first external electrode 40A is smaller than the dimension T2 in the height direction T of the first surface portion 40A1. In other words, at both ends in the height direction T of the fourth surface portion 40A4 and the fifth surface portion 40A5 of the first external electrode 40A, there exist portions where the external electrode is not provided and the surface of the multilayer body 10 is exposed. Furthermore, the dimension T1 in the height direction T of the fourth surface portion 40A4 and the fifth surface portion 40A5 of the first external electrode 40A is preferably smaller than the dimension t of the multilayer body 10 in the height direction T. With such a configuration, the spreading of the solder to the first lateral surface WS1 and the second lateral surface WS2 (the fourth surface portion 40A4 and the fifth surface portion 40A5 of the first external electrode 40A) of the multilayer body 10 is reduced or prevented, such that it is possible to reduce or prevent stress applied in the rotational direction. Therefore, the advantageous self-alignment effect is improved, and the mountability of the multilayer ceramic capacitor 1 is stabilized. As a result, it is possible to prevent the occurrence of a short circuit defect.

The dimension T1 in the height direction T of each of the fourth surface portion 40A4 and the fifth surface portion 40A5 of the first external electrode 40A is preferably, for example, about 40% or more and 80% or less of the dimension t of the multilayer body 10 in the height direction T. It is more preferably, for example, 60% or more and 80% or less.

The dimension L2 in the length direction L of each of the fourth surface portion 40A4 and the fifth surface portion 40A5 of the first external electrode 40A is preferably, for example, about 4% or more and about 40% or less of the dimension l of the multilayer body 10 in the length direction L. It is more preferably, for example, about 10% or more and about 20% or less.

The dimension T1 in the height direction T of the ninth surface portion 40B4 and the tenth surface portion 40B5 of the second external electrode 40B is smaller than the dimension T2 in the height direction T of the sixth surface portion 40B1. In other words, at both ends in the height direction T of the ninth surface portion 40B4 and the tenth surface portion 40B5 of the second external electrode 40B, there exist portions where the external electrode is not provided and the surface of the multilayer body 10 is exposed. Furthermore, the dimension T1 in the height direction T of the ninth surface portion 40B4 and the tenth surface portion 40B5 of the second external electrode 40B is preferably smaller than the dimension t in the height direction T of the multilayer body 10. With such a configuration, the spreading of the solder to the first lateral surface WS1 and the second lateral surface WS2 (the ninth surface portion 40B4 and the tenth surface portion 40B5 of the second external electrode 40B) of the multilayer body 10 is reduced or prevented, such that it is possible to reduce or prevent the stress applied in the rotation direction. Therefore, the self-alignment effect is improved, and the mountability of the multilayer ceramic capacitor 1 is stabilized. As a result, it is possible to prevent the occurrence of a short circuit defect.

The dimension T1 in the height direction T of each of the ninth surface portion 40B4 and the tenth surface portion 40B5 of the second external electrode 40B is preferably, for example, about 40% or more and about 80% or less of the dimension t of the multilayer body 10 in the height direction T. It is more preferably, for example, about 60% or more and about 80% or less.

The dimension L2 in the length direction L of each of the ninth surface portion 40B4 and the tenth surface portion 40B5 of the second external electrode 40B is preferably, for example, about 4% or more and about 40% or less of the dimension l of the multilayer body 10 in the length direction L. It is more preferably, for example, about 10% or more and about 20% or less.

The shapes of the second surface portion 40A2 and the third surface portion 40A3, and the seventh surface portion 40B2 and the eighth surface portion 40B3 are not particularly limited, but are preferably rectangular or substantially rectangular.

The shapes of the fourth surface portion 40A4 and the fifth surface portion 40A5, and the ninth surface portion 40B4 and the tenth surface portion 40B5 are not particularly limited, but are preferably rectangular or substantially rectangular.

The dimension W2 in the width direction W of the first surface portion 40A1 of the first external electrode 40A and the dimension T2 in the height direction T of the first surface portion 40A1 of the first external electrode 40A are measured using a microscope. More specifically, the dimension W2 in the width direction W of the first surface portion 40A1 of the first external electrode 40A is measured at a position about ½ in the height direction T of the multilayer ceramic capacitor 1, and the dimension T2 in the height direction T of the first surface portion 40A1 of the first external electrode 40A is measured at a position about ½ in the width direction W of the multilayer ceramic capacitor 1.

The dimension W1 in the width direction W of the second surface portion 40A2 and the third surface portion 40A3 of the first external electrode 40A and the dimension L1 in the length direction L of the second surface portion 40A2 and the third surface portion 40A3 of the first external electrode 40A are measured by using a microscope. More specifically, the dimension W1 in the width direction W of the second surface portion 40A2 and the third surface portion 40A3 of the first external electrode 40A is measured at a position about ½ of the dimension L1 in the length direction L of the second surface portion 40A2 and the third surface portion 40A3 of the first external electrode 40A, and the dimension L1 in the length direction L of the second surface portion 40A2 and the third surface portion 40A3 of the first external electrode 40A is measured at a position about ½ in the width direction W of the multilayer ceramic capacitor 1.

The dimension T1 in the height direction T of the fourth surface portion 40A4 and the fifth surface portion 40A5 of the first external electrode 40A and the dimension L2 in the length direction L of the fourth surface portion 40A4 and the fifth surface portion 40A5 of the first external electrode 40A are measured by using a microscope. More specifically, the dimension T1 in the height direction T of the fourth surface portion 40A4 and the fifth surface portion 40A5 of the first external electrode 40A is measured at a position about ½ of the dimension L2 in the length direction L of each of the fourth surface portion 40A4 and the fifth surface portion 40A5 of the first external electrode 40A, and the dimension L2 in the length direction L of the fourth surface portion 40A4 and the fifth surface portion 40A5 of the first external electrode 40A is measured at a position about ½ of the dimension T1 in the height direction T of each of the fourth surface portion 40A4 and the fifth surface portion 40A5 of the first external electrode 40A.

The dimension W2 in the width direction W of the sixth surface portion 40B1 of the second external electrode 40B and the dimension T2 in the height direction T of the sixth surface portion 40B1 of the second external electrode 40B are measured by using a microscope. More specifically, the dimension W2 in the width direction W of the sixth surface portion 40B1 of the second external electrode 40B is measured at a position about ½ in the height direction T of the multilayer ceramic capacitor 1, and the dimension T2 in the height direction T of the sixth surface portion 40B1 of the second external electrode 40B is measured at a position about ½ in the width direction W of the multilayer ceramic capacitor 1.

The dimension W1 in the width direction W of the seventh surface portion 40B2 and the eighth surface portion 40B3 of the second external electrode 40B and the dimension L1 in the length direction L of the seventh surface portion 40B2 and the eighth surface portion 40B3 of the second external electrode 40B are measured by using a microscope. More specifically, the dimension W1 in the width direction W of the seventh surface portion 40B2 and the eighth surface portion 40B3 of the second external electrode 40B is measured at a position about ½ of the dimension L1 in the length direction L of the seventh surface portion 40B2 and the eighth surface portion 40B3 of the second external electrode 40B, and the dimension L1 in the length direction L of the seventh surface portion 40B2 and the eighth surface portion 40B3 of the second external electrode 40B is measured at a position about ½ in the width direction W of the multilayer ceramic capacitor 1.

The dimension T1 in the height direction T of the ninth surface portion 40B4 and the tenth surface portion 40B5 of the second external electrode 40B and the dimension L2 in the length direction L of the ninth surface portion 40B4 and the tenth surface portion 40B5 of the second external electrode 40B are measured by using a microscope. More specifically, the dimension T1 in the height direction T of the ninth surface portion 40B4 and the tenth surface portion 40B5 of the second external electrode 40B is measured at a position about ½ of the dimension L2 in the length direction L of the ninth surface portion 40B4 and the tenth surface portion 40B5 of the second external electrode 40B, and the dimension L2 in the length direction L of the ninth surface portion 40B4 and the tenth surface portion 40B5 of the second external electrode 40B is measured at a position about ½ of the dimension T1 in the height direction T of the ninth surface portion 40B4 and the tenth surface portion 40B5 of the second external electrode 40B.

As shown in FIG. 10A, the first external electrode 40A includes a first base electrode layer 50A and a first plated layer 60A provided on the first base electrode layer 50A. The first base electrode layer 50A is provided on the surface of the multilayer body 10. The first plated layer 60A covers the first base electrode layer 50A.

As shown in FIG. 10B, the second external electrode 40B has a second base electrode layer 50B and a second plated layer 60B disposed on the second base electrode layer 50B. The second base electrode layer 50B is provided on the surface of the multilayer body 10. The second plated layer 60B covers the second base electrode layer 50B.

The first base electrode layer 50A and the second base electrode layer 50B include at least one selected from a fired layer and a thin film layer, for example.

The first base electrode layer 50A and the second base electrode layer 50B are thin film layers in a preferred embodiment of the present invention. The thin film layer is a layer on which metal particles are deposited.

In a case in which the first base electrode layer 50A and the second base electrode layer 50B are formed as thin film layers, they are preferably formed by a thin film forming method such as a sputtering method or a deposition method. Here, an electrode, defined as sputtered electrode, formed using, for example, a sputtering method will be described.

The first base electrode layer 50A according to a preferred embodiment of the present invention is made of a first thin film layer 51A formed by, for example, a sputtered electrode. The second base electrode layer 50B is made of a second thin film layer 51B formed by, for example, a sputtered electrode. When the base electrode layer is formed by a sputtered electrode, it is preferable to form the sputtered electrode directly on the first main surface TS1 and the second main surface TS2 of the multilayer body 10.

As shown in FIGS. 6 and 10A, the first thin film layer 51A formed by the sputtered electrode is provided on a portion of the first main surface TS1 on the first end surface LS1 side and on a portion of the second main surface TS2 on the first end surface LS1 side. More specifically, it is preferable that the first thin film layer 51A is provided at a portion covered by the first external electrode 40A shown in FIG. 4 on the first main surface TS1. It is preferable that the first thin film layer 51A is provided at a portion covered by the first external electrode 40A shown in FIG. 5 on the second main surface TS2.

Furthermore, it is preferable that the first thin film layer 51A is provided on a portion of the first main surface TS1 and a portion of the first end surface LS1 in a manner somewhat surrounding the portion of the first end surface LS1 which is provided continuously from the portion of the first main surface TS1. It is preferable that the first thin film layer 51A is provided on a portion of the second main surface TS2 and a portion of the first end surface LS1 so as to surround or substantially surround the portion of the first end surface LS1 which is provided continuously from the portion of the second main surface TS2.

Figure 12:
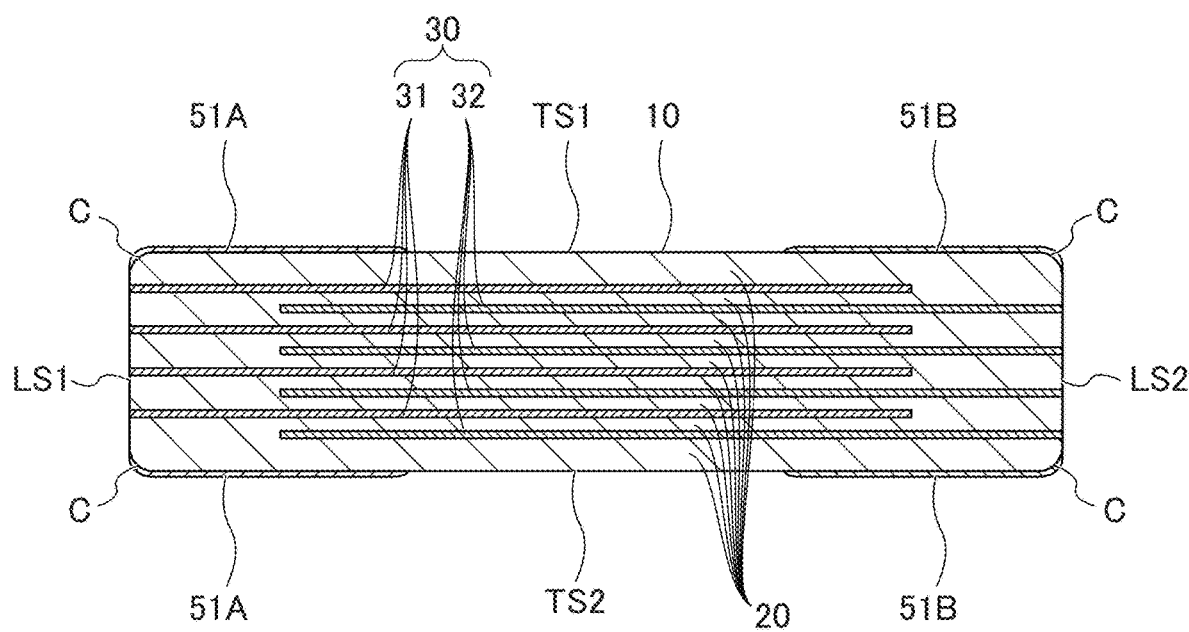
FIG. 12 is a diagram of an intermediate state in the manufacturing processing of the multilayer ceramic capacitor of the above preferred embodiment of the present invention.

For example, as shown in FIG. 12 explaining the manufacturing steps to be described later, in a case in which a chamfered portion C such as a rounded portion is provided at the ridge of the multilayer body 10, it is preferable that the first thin film layer 51A is provided on a portion of the first main surface TS1 on the first end surface LS1 side, and a chamfered portion C on the first end surface LS1 side which is provided continuously from the portion of the first main surface TS1 on the first end surface LS1 side. It is preferable that the first thin film layer 51A is provided on a portion of the second main surface TS2 on the first end surface LS1 side, and the chamfered portion C on the first end surface LS1 side which is provided continuously from the portion of the second main surface TS2 on the first end surface LS1 side. With such a configuration, it is possible to easily form thin film layers by, for example, a sputtering method or other methods.

According to the above-described method, when forming a plated layer, it is possible to control the distances between the first thin film layer 51A provided on a portion of the first end surface LS1 and the internal electrode layers 30 exposed on the first end surface LS1. Thus, it becomes easy to deposit a plated layer also on the surface of the multilayer body 10 between the first thin film layer 51A provided on a portion of the first end surface LS1 and the internal electrode layers 30 exposed on the first end surface LS1.

As shown in FIGS. 6 and 10B, the second thin film layer 51B formed by the sputtered electrode is provided on a portion of the first main surface TS1 on the second end surface LS2 side and on a portion of the second main surface TS2 on the second end surface LS2 side. More specifically, it is preferable that the second thin film layer 51B is provided on a portion of the first main surface TS1 which is covered by the second external electrode 40B shown in FIG. 4. It is preferable that the second thin film layer 51B is provided on a portion of the second main surface TS2 which is covered by the second external electrode 40B shown in FIG. 5.

Furthermore, it is preferable that the second thin film layer 51B is provided on a portion of the first main surface TS1 and a portion of the second end surface LS2 in a manner somewhat surrounding the portion of the second end surface LS1 which is provided continuously from the portion of the first main surface TS1. It is preferable that the second thin film layer 51B is provided on a portion of the second main surface TS2 and a portion of the second end surface LS2 in a manner somewhat surrounding the portion of the second end surface LS2 which is provided continuously from the portion of the second main surface TS2.

For example, as shown in FIG. 12 explaining the manufacturing steps to be described later, in a case in which a chamfered portion C such as a rounded portion is provided at the ridge of the multilayer body 10, it is preferable that the second thin film layer 51B is provided on a portion of the first main surface TS1 on the second end surface LS2 side, and a chamfered portion C on the second end surface LS2 side which is provided continuously from the portion of the first main surface TS1 on the second end surface LS2 side. It is preferable that the second thin film layer 51B is provided on a portion of the second main surface TS2 on the second end surface LS2 side, and the chamfered portion C on the second end surface LS2 side which is provided continuously from the portion of the second main surface TS2 on the second end surface LS2 side. With such a configuration, it is possible to easily form thin film layers by, for example, a sputtering method or other methods.

According to the above-described method, when forming a plated layer, it is possible to control the distances between the second thin film layer 51B provided on a portion of the second end surface LS2 and the internal electrode layers 30 exposed on the second end surface LS2. Thus, it becomes easy to deposit a plated layer also on the surface of the multilayer body 10 between the second thin film layer 51B provided on a portion of the second end surface LS2 and the internal electrode layers 30 exposed on the second end surface LS2.

The thin film layer is made of the sputtered metal to form the sputtered electrode. The metal preferably includes at least one metal selected from the group including, for example, Mg, Al, Ti, W, Cr, Cu, Ni, Ag, Co, Mo and V. Thus, it is possible to increase the adhesion of the external electrode 40 to the multilayer body 10. The thin film layer may be a single layer or may include a plurality of layers. For example, the thin film layer may include a two-layer structure including a layer of Ni—Cr alloy and a layer of Ni—Cu alloy.

The thickness of the sputtered electrode in the lamination direction between the first main surface TS1 and the second main surface TS2 is preferably, for example, about 50 nm or more and about 400 nm or less, and more preferably, for example, 50 nm or more and 130 nm or less.

When providing the base electrode layer by directly forming an electrode using the sputtering method on the first main surface TS1 and the second main surface TS2 of the multilayer body 10, it is preferable to provide a base electrode layer as a fired layer on the first end surface LS1 and the second end surface LS2, or alternatively it is preferable to directly provide a plated layer to be described later without providing the base electrode layer. In a preferred embodiment of the present invention, a plated layer to be described later is directly provided on the first end surface LS1 and the second end surface LS2 without providing a base electrode layer.

As will be described later in a modified example of a preferred embodiment of the present invention, the first base electrode layer 50A and the second base electrode layer 50B may be fired layers. It is preferable that the fired layer includes a metal component, and either a glass component or a ceramic component, or a metal component and both a glass component and a ceramic component. The metal component preferably includes at least one selected from Cu, Ni, Ag, Pd, Ag—Pd alloys, and Au, for example. The glass component includes at least one selected from B, Si, Ba, Mg, Al, and Li, for example. For the ceramic component, a ceramic material of the same kind as that of the dielectric layer 20 may be used, or a ceramic material of a different kind may be used. The ceramic component includes, for example, at least one selected from $BaTiO_3$, $CaTiO_3$, $(Ba, Ca)TiO_3$, $SrTiO_3$, and $CaZrO_3$, for example.

The fired layer is obtained, for example, by applying a conductive paste including glass and metal to the multilayer body 10 and firing the paste. The fired layer may be obtained, for example, by co-firing a laminated chip including internal electrode layers and dielectric layers, and a conductive paste applied to the laminated chip, or may be obtained, for example, by firing the laminated chip including the internal electrode layers and the dielectric layers to obtain the multilayer body 10, and thereafter applying the conductive paste to the multilayer body 10 for firing. In a case of co-firing the laminated chip including the internal electrode layers and the dielectric layers, and the conductive paste applied to the laminated chip, it is preferable that the fired layer is formed by firing a material to which a ceramic material instead of glass component is added. In this case, it is particularly preferable to use, as the ceramic material to be added, the same type of ceramic material as the dielectric layer 20. Furthermore, the fired layer may include a plurality of layers.

Alternatively, the first plated layer 60A and the second plated layer 60B described later may be directly provided on the multilayer body 10 without the first base electrode layer 50A and the second base electrode layer 50B provided.

The first plated layer 60A covers the first base electrode layer 50A.

The second plated layer 60B covers the second base electrode layer 50B.

The first plated layer 60A and the second plated layer 60B may include at least one selected from Cu, Ni, Sn, Ag, Pd, Ag—Pd alloys, and Au, for example. Each of the first plated layer 60A and the second plated layer 60B may include a plurality of layers.

In a case in which the base electrode layer is made of a thin film layer, it is preferable that the plated layer includes a three-layer structure including, for example, a Cu plated layer defining and functioning as a lower plated layer, a Ni plated layer defining functioning as an intermediate plated layer, and a Sn plated layer defining functioning as an upper plated layer. That is, the first plated layer 60A includes a first Cu plated layer 61A, a first Ni plated layer 62A, and a first Sn plated layer 63A. The second plated layer 60B includes a second Cu plated layer 61B, a second Ni plated layer 62B, and a second Sn plated layer 63B. However, the first plated layer 60A and the second plated layer 60B are not limited to a three-layer structure, and may have other layer configurations.

The first Cu plated layer 61A covers the first end surface LS1 of the multilayer body 10, and the first thin film layer 51A defining functioning as the first base electrode layer 50A provided on the first main surface TS1 and the second main surface TS2 of the multilayer body 10. In a preferred embodiment of the present invention, the first Cu plated layer 61A covers portions of the first lateral surface WS1 and the second lateral surface WS2 of the multilayer body 10 at which the internal electrode layers 30 are exposed. At this time, the gap between the first thin film layer 51A and the internal electrode layer 30 exposed on the first end surface LS1 of the multilayer body 10, and the gaps between the internal electrode layers 30 exposed on the first lateral surface WS1 and the second lateral surface WS2 of multilayer body 10 are made narrow. Therefore, a plated layer is also deposited on the regions of these gaps.

The first Ni plated layer 62A covers the first Cu plated layer 61A. The first Sn plated layer 63A covers the first Ni plated layer 62A. In a preferred embodiment of the present invention, the first plated layer 60A is electrically connected directly to the first internal electrode layer 31.

The second Cu plated layer 61B covers the second end surface LS2 of the multilayer body 10, and the second thin film layer 51B defining and functioning as the second base electrode layer 50B provided on the first main surface TS1 and the second main surface TS2 of the multilayer body 10. In a preferred embodiment of the present invention, the second Cu plated layer 61B covers portions of the first lateral surface WS1 and the second lateral surface WS2 of the multilayer body 10 at which the internal electrode layers 30 are exposed. At this time, the gap between the second thin film layer 51B and the internal electrode layer 30 exposed on the second end surface LS2 of multilayer body 10, and the gaps between the internal electrode layers 30 exposed on the first lateral surface WS1 and the second lateral surface WS2 of multilayer body 10 are made narrow. Therefore, a plated layer is also deposited on the regions of these gaps.

The second Ni plated layer 62B covers the second Cu plated layer 61B. The second Sn plated layer 63B covers the second Ni plated layer 62B layer. In a preferred embodiment of the present invention, the second plated layer 60B is electrically connected directly to the second internal electrode layer 32.

By providing a plated layer made of a Cu plated layer and a Ni plated layer so as to cover the base electrode layer, the base electrode layer is prevented from being eroded by solder at the time of mounting the multilayer ceramic capacitor 1. Furthermore, by providing the Sn plated layer on the surface of the Ni plated layer, the wettability of the solder when mounting the multilayer ceramic capacitor 1 is improved. With such a configuration, it is possible to easily mount the multilayer ceramic capacitor 1.

The thickness per plated layer is preferably, for example about 2 µm or more and about 15 µm or less. That is, the average thickness of each of the first Cu plated layer 61A, the first Ni plated layer 62A, the first Sn plated layer 63A, the second Cu plated layer 61B, the second Ni plated layer 62B, and the second Sn plated layer 63B is preferably, for example, about 2 µm or more and about 15 µm or less. More specifically, the average thickness of each of the first Cu plated layer 61A and the second Cu plated layer 61B is more preferably, for example, about 5 µm or more and about 8 µm or less. Furthermore, the average thickness of each of the first Ni plated layer 62A, the first Sn plated layer 63A, the second Ni plated layer 62B, and the second Sn plated layer 63B is more preferably, for example, about 2 µm or more and about 4 µm or less.

When the dimension in the length direction between the first end surface LS1 and the second end surface LS2 of the multilayer ceramic capacitor 1 including the multilayer body 10 and the external electrodes 40 is defined as dimension L, the dimension L is preferably, for example, about 0.1 mm or more and about 0.8 mm or less. When the dimension in the width direction between the first lateral surface WS1 and the second lateral surface WS2 of the multilayer ceramic capacitor 1 is defined as dimension W, the dimension W is preferably, for example, about 0.2 mm or more and about 1.6 mm or less. When the dimension in the height direction between the first main surface TS1 and the second main surface TS2 of the multilayer ceramic capacitor 1 is defined as dimension T, the dimension T is preferably, for example, about 0.05 mm or more and about 0.2 mm or less. The dimension L in the length direction of the multilayer ceramic capacitor 1 of a preferred embodiment of the present invention is smaller than the dimension W in the width direction of the multilayer ceramic capacitor 1. In a preferred embodiment of the present invention, the height direction between the first main surface TS1 and the second main surface TS2 of the multilayer ceramic capacitor 1 corresponds to the lamination (stacking) direction of the dielectric layers 20 and the internal electrode layers 30.

According to the present preferred embodiment, it is possible to reduce or prevent solder wetting with respect to the first lateral surface WS1 and the second lateral surface WS2 (the fourth surface portion 40A4, the fifth surface portion 40A5, the ninth surface portion 40B4, and the tenth surface portion 40B5 of the external electrode 40) of the multilayer body 10. This is because no external electrode is provided at the ridges of the first lateral surface WS1 and the second lateral surface WS2 of the multilayer body 10, and there is a portion where the surface of the multilayer body 10 is exposed. By reducing or preventing solder wetting with respect to the first lateral surface WS1 and the second lateral surface WS2 (the fourth surface portion 40A4, the fifth surface portion 40A5, the ninth surface portion 40B4, and the tenth surface portion 40B5 of the external electrode 40) of the multilayer body 10, it is possible to reduce or prevent the stress applied in the rotation direction. Therefore, the advantageous self-alignment effect is improved, and the mountability of the multilayer ceramic capacitor 1 is stabilized. As a result, it is possible to prevent the occurrence of short circuit failure or the like. In addition, the self-alignment effect refers to an effect whereby, when soldering, a force that reduces the surface area of a molten solder, i.e., the surface tension, is applied to the molten solder, such that the electronic element as a mounting target supported by the molten solder is moved, the positioning is performed. By obtaining this self-alignment effect, it is possible to reduce or prevent positional deviation at the time of mounting.

Figure 11A:
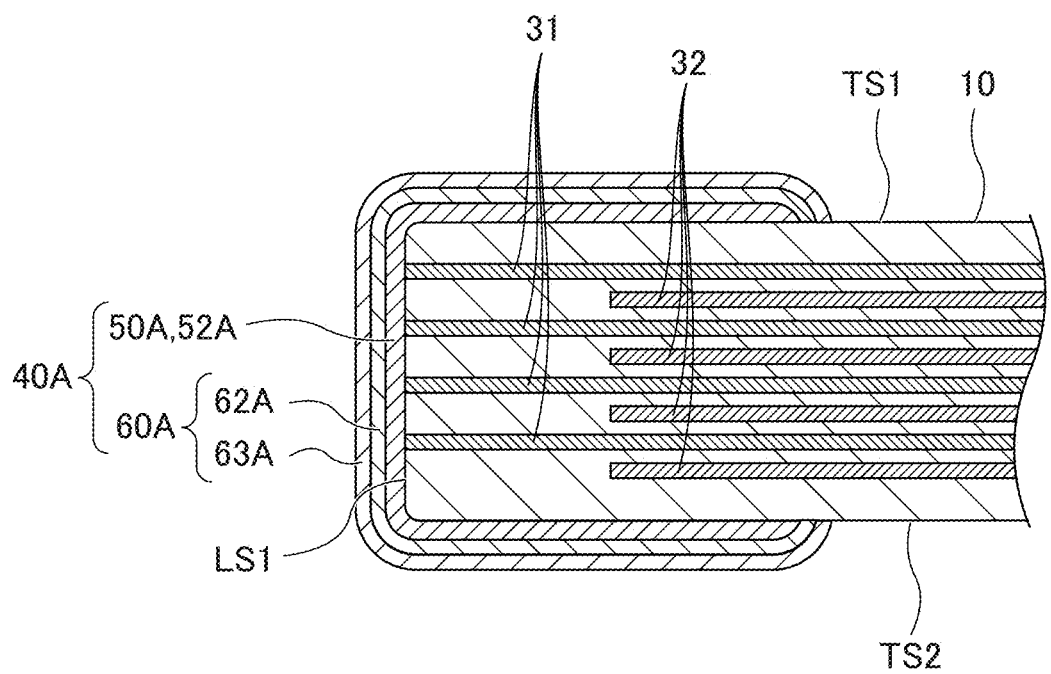
FIG. 11A is a cross-sectional view of a modified example of a layer configuration of an external electrode of the multilayer ceramic capacitor of the above preferred embodiment of the present invention, and is a view corresponding to FIG. 10A.
Figure 11B:
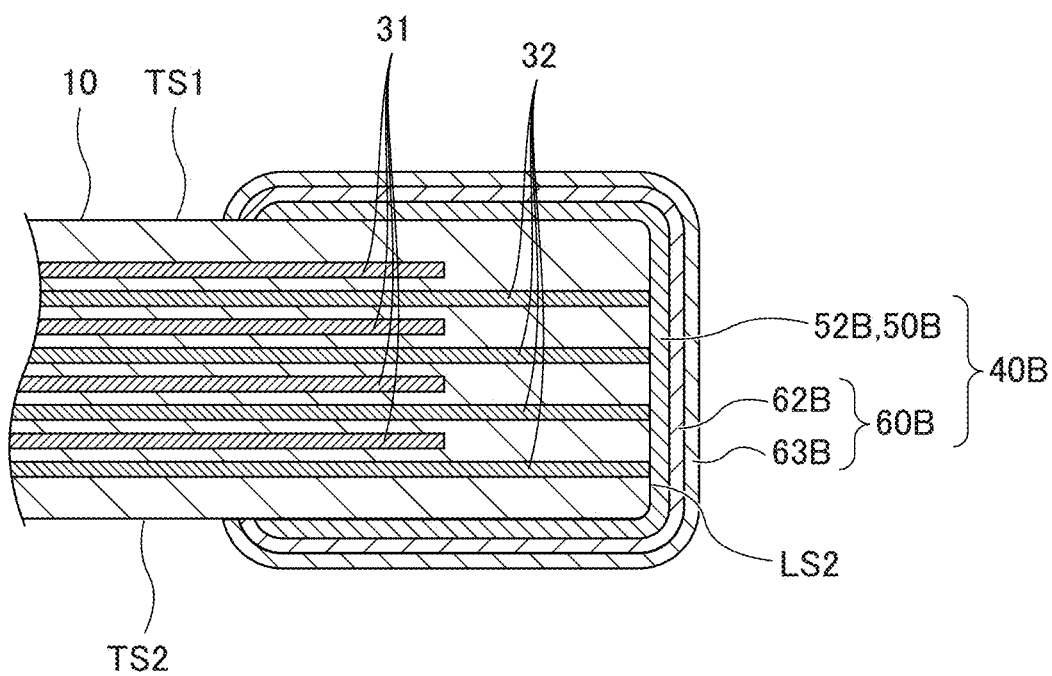
FIG. 11B is a cross-sectional view showing a modified example of a layer configuration of an external electrode of the multilayer ceramic capacitor of the above preferred embodiment of the present invention, and is a view corresponding to FIG. 10B.

Hereinafter, a description will be provided of a modified example of the layer configuration of the external electrode 40 of the multilayer ceramic capacitor 1 of a preferred embodiment of the present invention. In the following description, the same or corresponding components as those in the above-described embodiment are denoted by the same reference numerals, and a detailed description thereof is omitted. FIGS. 11A and 11B are each a cross-sectional view showing a modified example of a layer configuration of the external electrode 40 of the multilayer ceramic capacitor 1 according to a preferred embodiment of the present invention, and are views corresponding to FIGS. 10A and 10B, respectively.

In the present modified example, the configuration of the external electrode 40 differs from that of the above preferred embodiment.

The first external electrode 40A includes the first base electrode layer 50A and the first plated layer 60A. The first base electrode layer 50A of the present modified example includes a first fired layer 52A. The first plated layer 60A of the present modified example includes the first Ni plated layer 62A and the first Sn plated layer 63A.

The second external electrode 40B has the second base electrode layer 50B and the second plated layer 60B. The second base electrode layer 50B of the present modified example includes a second fired layer 52B. The second plated layer 60B of this modified example includes the second Ni plated layer 62B and the second Sn plated layer 63B.

In the present modified example, for example, similarly to the first external electrode 40A described above, the first base electrode layer 50A includes the first surface portion located on the first end surface LS1, the second surface portion located on a portion of the first main surface TS1, the third surface portion located on a portion of the second main surface TS2, the fourth surface portion located on a portion of the first lateral surface WS1, and the fifth surface portion located on a portion of the second lateral surface WS2. In this modified example, the first base electrode layer 50A is connected to the first internal electrode layers 31.

The first Ni plated layer 62A covers the first base electrode layer 50A. The first Sn plated layer 63A covers the first Ni plated layer 62A.

In the present modified example, for example, similarly to the second external electrode 40B described above, the second base electrode layer 50B includes a sixth surface portion located on the second end surface LS2, the seventh surface portion located on a portion of the first main surface TS1, the eighth surface portion located on a portion of the second main surface TS2, the ninth surface portion located on a portion of the first lateral surface WS1, and the tenth surface portion located on a portion of the second lateral surface WS2. In this modified example, the second base electrode layer 50B is connected to the second internal electrode layers 32.

The second Ni plated layer 62B covers the second base electrode layer 50B. The second Sn plated layer 63B covers the second Ni plated layer 62B.

The first fired layer 52A of the first base electrode layer 50A and the second fired layer 52B of the second base electrode layer 50B may be obtained by, for example, applying a conductive paste including glass and metal to a multilayer body, and firing the conductive paste. In a case of co-firing a laminated chip prior to firing and the conductive paste applied to the laminated chip, it is preferable that the fired layer is formed by firing a material to which a ceramic material instead of glass component was added. At this time, it is particularly preferable to use, as the ceramic material to be added, the same type of ceramic material as the dielectric layer 20.

In a case in which the base electrode layer is made of a fired layer, the first plated layer 60A and the second plated layer 60B preferably include, for example, a two-layer structure in which a Sn plated layer is provided on the Ni plated layer. In such a case, the Ni plated layer prevents the base electrode layer from being eroded by the solder when mounting the multilayer ceramic capacitor 1. Furthermore, the Sn plated layer also improves the wettability of the solder when mounting the multilayer ceramic capacitor 1. With such a configuration, it is possible to easily mount the multilayer ceramic capacitor 1.

The first plated layer 60A and the second plated layer 60B are not limited to the two-layer structure, and may have, for example, a three-layer structure including a Cu-plating or may include another layer structure as in the above-described preferred embodiment.

The thickness per plated layer is preferably, for example, about 2 μm or more and about 15 μm or less. That is, the average thickness of each of the first Ni plated layer 62A, the first Sn plated layer 63A, the second Ni plated layer 62B, and the second Sn plated layer 63B is preferably, for example, about 2 μm or more and about 15 μm or less. More specifically, it is more preferable that the average thickness of each of the first Ni plated layer 62A, the first Sn plated layer 63A, the second Ni plated layer 62B, and the second Sn plated layer 63B is, for example, about 2 μm or more and about 4 μm or less.

Next, a non-limiting example of a method of manufacturing the multilayer ceramic capacitor 1 according to a preferred embodiment of the present invention will be described.

A dielectric sheet for the dielectric layer 20 and a conductive paste for the internal electrode layer 30 are provided. The conductive paste for the dielectric sheet and the internal electrode preferably includes a binder and a solvent. A known binder and solvent may be used. A paste made of a conductive material is, for example, one made by an organic binder and an organic solvent being added to a metal powder.

A conductive paste for the internal electrode layer 30 is printed on the dielectric sheet using a printing plate that is patterned to form the shape of the internal electrode layer 30 of a preferred embodiment of the present invention by, for example, screen printing, gravure printing, or the like. Thus, the dielectric sheet on which the pattern of the first internal electrode layer 31 is provided, and the dielectric sheet on which the pattern of the second internal electrode layer 32 is provided are prepared.

A predetermined number of dielectric sheets on which the pattern of the internal electrode layer is not printed are laminated such that a portion is formed which functions as the first main surface-side outer layer portion 12 on the first main surface TS1 side. On top thereof, the dielectric sheet on which the pattern of the first internal electrode layer 31 is printed and the dielectric sheet on which the pattern of the second internal electrode layer 32 is printed are sequentially laminated alternately, such that a portion is formed which functions as the inner layer portion 11. On this portion functioning as the inner layer portion 11, a predetermined number of dielectric sheets in which the pattern of the internal electrode layer is not printed are laminated, such that a portion is formed which functions as the second main surface-side outer layer portion 13 on the second main surface TS2 side. Thus, a laminated sheet is produced.

The laminated sheet is pressed in the lamination direction by hydrostatic pressing, for example, such that a laminated block is produced.

The laminated block is cut to a predetermined size, such that laminated chips are cut out. At this time, corners and ridges of the laminated chips may be rounded by barrel polishing or the like.

The laminated chip is fired to produce the multilayer body 10. The firing temperature depends on the materials of the dielectric layers 20 and the internal electrode layers 30. However, it is preferably, for example, about 900° C. or more and about 1400° C. or less.

In a preferred embodiment of the present invention, the base electrode layer is made of a thin film layer. When forming the base electrode layer by a thin film layer, a thin film layer is formed at a portion where the external electrode of the multilayer body 10 is to be formed, by performing masking or other processing, for example. The thin film layer is formed by a thin film forming method such as, for example, a sputtering method or a deposition method. In a preferred embodiment of the present invention, a sputtered electrode as a thin film layer is formed by, for example, the sputtering method.

Figure 13:
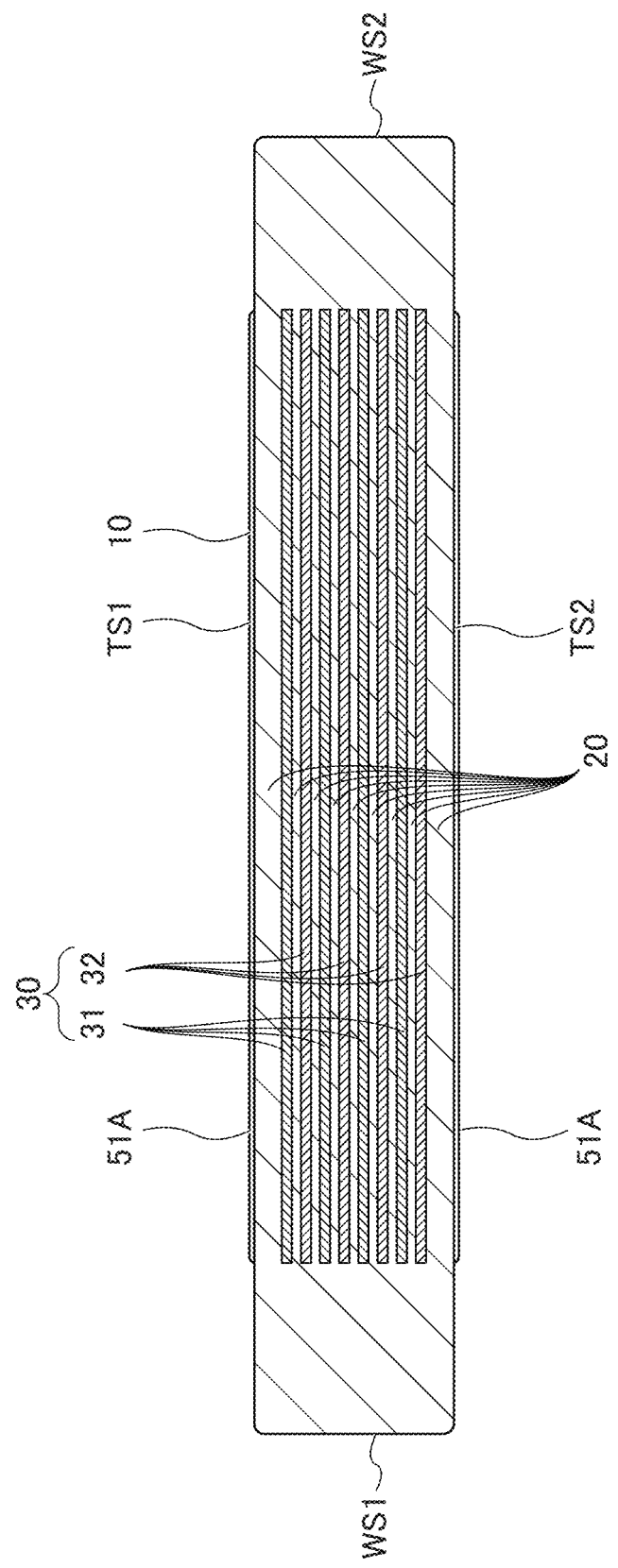
FIG. 13 is a diagram of an intermediate state in the manufacturing processing of the multilayer ceramic capacitor of the above preferred embodiment of the present invention.
Figure 14:
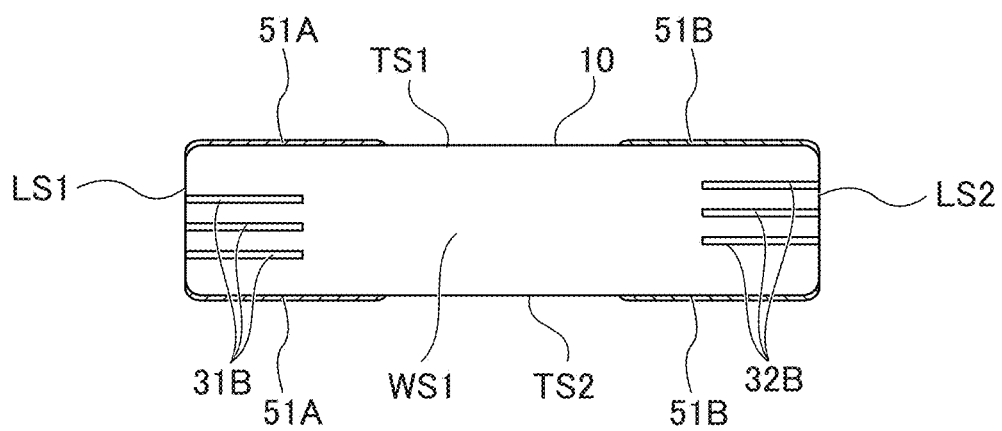
FIG. 14 is a diagram of an intermediate state in the manufacturing processing of the multilayer ceramic capacitor of the above preferred embodiment of the present invention.

FIGS. 12 to 14 are each a view of an intermediate state in the manufacturing processing of the multilayer ceramic capacitor of a preferred embodiment of the present invention, and a view showing a state after the thin film layer is provided on the multilayer body 10 and before the plated layer is provided. FIG. 12 is a view of a condition in which the first thin film layer 51A and the second thin film layer 51B as thin film layers are provided on the multilayer body 10, and corresponds to the LT cross section of FIG. 6. FIG. 13 is a view of a condition in which the first thin film layer 51A functioning as a thin film is provided on the multilayer body 10, and corresponds to the WT cross section of FIG. 7. FIG. 14 is a view of a condition in which the first thin film layer 51A and the second thin film layer 51B are provided on the multilayer body 10, and corresponds to FIG. 9 and shows a surface of the first lateral surface WS1 of the multilayer body 10.

The first thin film layer 51A formed by a sputtered electrode is provided on a portion of the first main surface TS1 on the first end surface LS1 side and a portion of the second main surface TS2 on first end surface LS1 side. The second thin film layer 51B formed by a sputtered electrode is provided on a portion of the first main surface TS1 on the second end surface LS2 side and a portion of the second main surface TS2 on the second end surface LS2 side.

In a preferred embodiment of the present invention, the thin film layer formed by a sputtered electrode is provided on a portion of the first main surface TS1 and on a portion of the second main surface TS2, and a portion of the first end surface LS1 and on a portion of the second end surface LS2 surrounds or substantially surrounds the portion of the first end surface LS1 and the portion of the second end surface LS2 continuously from the portion of the first main surface TS1 and the portion of the second main surface TS2. With such a configuration, it is possible to control the distance between the thin film layer provided on a portion of the first end surface LS1 and on a portion of the second end surface LS2 in a manner somewhat surrounding the portion of the first end surface LS1 and the portion of the second end surface LS2, and the internal electrode layers exposed on the first end surface LS1 and the second end surface LS2. Thus, it is possible to deposit a plated layer even on the surface of the multilayer body 10 between the thin film layer provided on the portion of the first end surface LS1 and the portion of the second end surface LS2, and the internal electrode layers exposed on the first end surface LS1 and the second end surface LS2.

Thereafter, a plated layer is formed on the surfaces of the base electrode layer made of the thin film layer and the multilayer body. In a preferred embodiment of the present invention, as the plated layer, three plated layers including, for example, a Cu plated layer, a Ni plated layer, and a Sn plated layer are formed.

The plated layer is preferably formed by, for example, an electrolytic plating method. Barrel plating, for example, is preferably used as the plating method.

Furthermore, the plated layer covers portions of the first end surface LS1 and the second end surface LS2 of the multilayer body 10 at which the internal electrode layers 30 are exposed. The plated layer covers portions of the first lateral surface WS1 and the second lateral surface WS2 of the multilayer body 10 at which the internal electrode layers 30 are exposed. At this time, by making narrower the gap between the thin film layer and the internal electrode layer exposed on the surface of multilayer body 10, and the gaps between the internal electrode layers 30 exposed on the surface of multilayer body 10, a plated layer is also deposited on the regions of these gaps.

In addition, when it is difficult to control the formation of the plated layer, masking may be performed at a location where a surface of the multilayer body 10 is exposed to form a plated layer. This facilitates formation of a plated layer having a desired shape.

When the base electrode layer is formed by a fired layer, on the first end surface LS1 side of the multilayer body 10, a conductive paste functioning as the first base electrode layer is applied to the first surface portion located on the first end surface LS1, the second surface portion located on a portion of first main surface TS1, the third surface portion located on a portion of second main surface TS2, the fourth surface portion located on a portion of the first lateral surface WS1, and the fifth surface portion located on a portion of the second lateral surface WS2 of the multilayer body 10. Furthermore, on the second end surface LS2 side of the multilayer body 10, a conductive paste functioning as the second base electrode layer is applied to the sixth surface portion located on the second end surface LS2, the seventh surface portion located on a portion of the first main surface TS1, the eighth surface portion located on a portion of the second main surface TS2, the ninth surface portion located on a portion of the first lateral surface WS1, and the tenth surface portion located on a portion of the second lateral surface WS2 of the multilayer body 10.

Masking, etc. may be performed in advance for a portion where it is not desired to provide a base electrode layer. After masking, a conductive paste including a glass component and metal is applied to the multilayer body 10 by, for example, a method such as dipping or screen printing. Thereafter, firing processing is performed to form a base electrode layer. The temperature of the firing processing at this time is preferably, for example, about 700° C. or higher and about 900° C. or less.

In a case of co-firing a laminated chip prior to firing and the conductive paste applied to the laminated chip, it is preferable that the fired layer is formed by firing a material to which a ceramic material instead of glass component is added. At this time, it is particularly preferable to use, as the ceramic material to be added, the same type of ceramic material as the dielectric layer 20. In this case, the multilayer body 10 including a fired layer therein is obtained by applying the conductive paste to the laminated chip prior to firing, and co-firing the laminated chip and the conductive paste applied to the laminated chip.

Thereafter, a plated layer is formed on the surface of the base electrode layer made of the fired layer and the multilayer body 10. When the base electrode layer is formed by a fired layer, for example, a two-layer plated layer including a Ni plated layer and a Sn plated layer is formed. The plated layer is formed by, for example, an electrolytic plating method. Barrel plating is preferably used for the plating method.

In addition, when it is difficult to control the formation of the plated layer, masking may be performed at a location where a surface of the multilayer body 10 is exposed to form a plated layer. This facilitates formation of a plated layer having a desired shape.

The multilayer ceramic capacitor 1 is preferably manufactured according to such a manufacturing process.

Figure 15A:
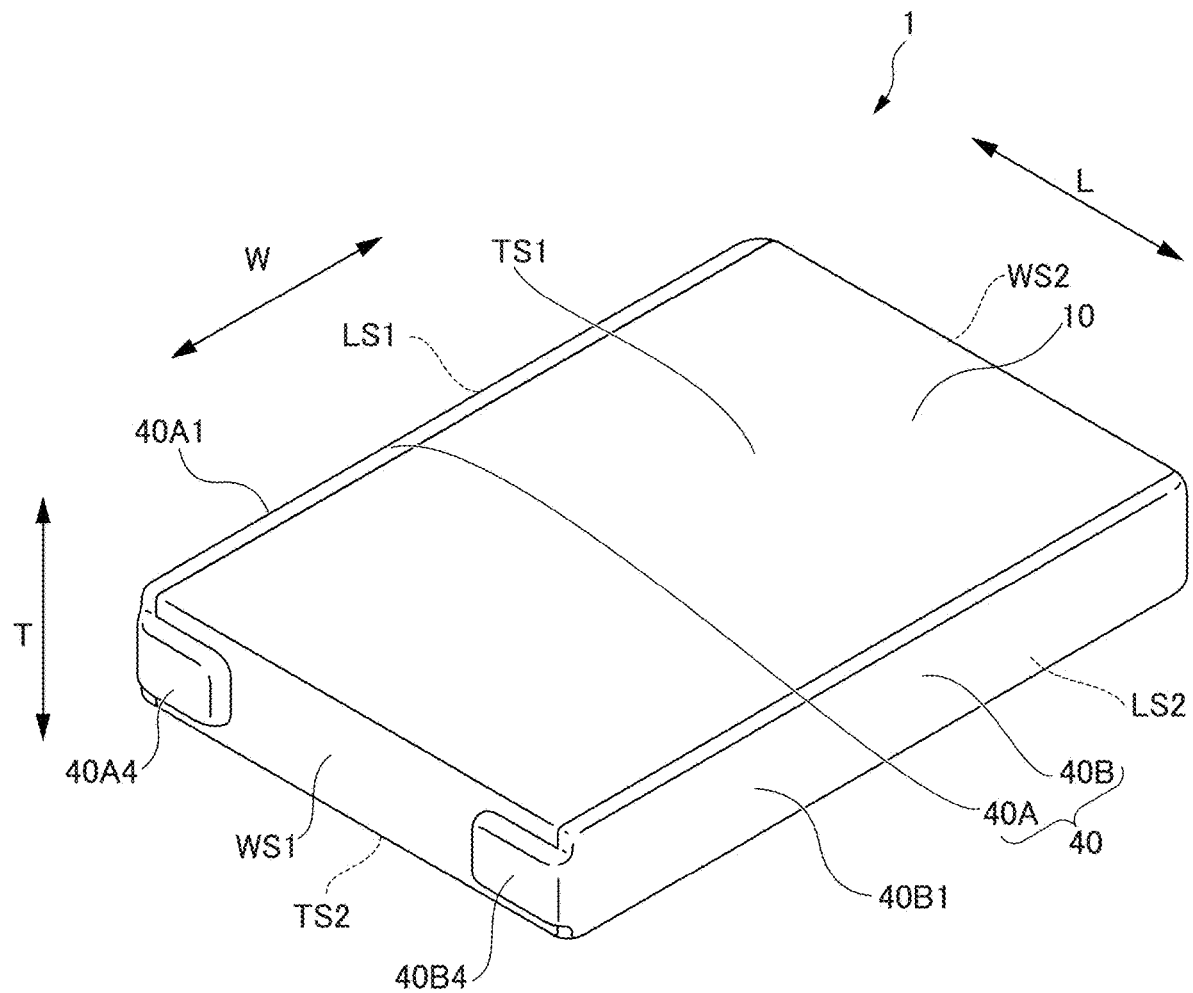
FIG. 15A is an external perspective view of a first modified example in relation to the shape of the external electrode of the multilayer ceramic capacitor of the above preferred embodiment of the present invention, and corresponds to FIG. 1.

In addition, the configuration of the external electrode 40 is not limited to the above-described configurations. Hereinafter, descriptions are provided of a first modified example of a preferred embodiment of the present invention in relation to the shape of the external electrode 40 of the multilayer ceramic capacitor 1 of a preferred embodiment of the present invention. In the following description, the same or corresponding components as those of the above preferred embodiment are denoted by the same reference numerals, and a detailed description thereof is omitted. FIG. 15A is a cross-sectional view showing the first modified example in relation to the shape of the external electrode 40 of the multilayer ceramic capacitor 1 of a preferred embodiment of the present invention, and is a view corresponding to FIG. 1.

In the present modified example, the shape of the external electrode 40 differs from that of the above-described preferred embodiment. In the present modified example, the first external electrode 40A and the second external electrode 40B are provided on only one selected from the first main surface TS1 and the second main surface TS2.

For example, the first external electrode 40A of the present modified example includes the first surface portion 40A1 located on the first end surface LS1, the third surface portion 40A3 located on a portion of the second main surface TS2, the fourth surface portion 40A4 located on a portion of the first lateral surface WS1, and the fifth surface portion 40A5 located on a portion of the second lateral surface WS2. That is, the first external electrode 40A of the present modified example is not provided on the first main surface TS1.

For example, the second external electrode 40B of the present modified example includes the sixth surface portion 40B1 located on the second end surface LS2, the eighth surface portion 40B3 located on a portion of the second main surface TS2, the ninth surface portion 40B4 located on a portion of the first lateral surface WS1, and the tenth surface portion 40B5 located on a portion of the second lateral surface WS2. That is, the second external electrode 40B of the present modified example is not provided on the first main surface TS1.

In this modified example, the dimension W1 in the width direction W of the third surface portion 40A3 of the first external electrode 40A is smaller than the dimension W2 of the first surface portion 40A1 in the width direction W. The dimension W1 in the width direction W of the third surface portion 40A3 of the first external electrode 40A is smaller than the dimension w of the multilayer body 10 in the width direction W. The dimension W1 in the width direction W of the eighth surface portion 40B3 of the second external electrode 40B is smaller than the dimension W2 in the width direction W of the sixth surface portion 40B1. The dimension W1 in the width direction W of the eighth surface portion 40B3 of the second external electrode 40B is smaller than the dimension w of the multilayer body 10 in the width direction W.

Even with such a configuration, it is possible to reduce or prevent deterioration of the self-alignment effect, and it is possible to perform stable mounting. Furthermore, by not providing the first external electrode 40A and the second external electrode 40B on the main surface of either the first main surface TS1 or the second main surface TS2, it is possible to reduce the dimension of the multilayer ceramic capacitor 1 in the height direction T, and it is possible to achieve a reduced height of the multilayer ceramic capacitor 1. In addition, by not providing the first external electrode 40A and the second external electrode 40B on the main surface of either the first main surface TS1 or the second main surface TS2, it is possible to further secure the height of the multilayer body 10 by the thickness of the external electrode 40. Therefore, it is possible to increase the volume of the active layer portion of the multilayer body 10, and thus it is possible to achieve higher capacitance of the multilayer ceramic capacitor 1.

Figure 15B:
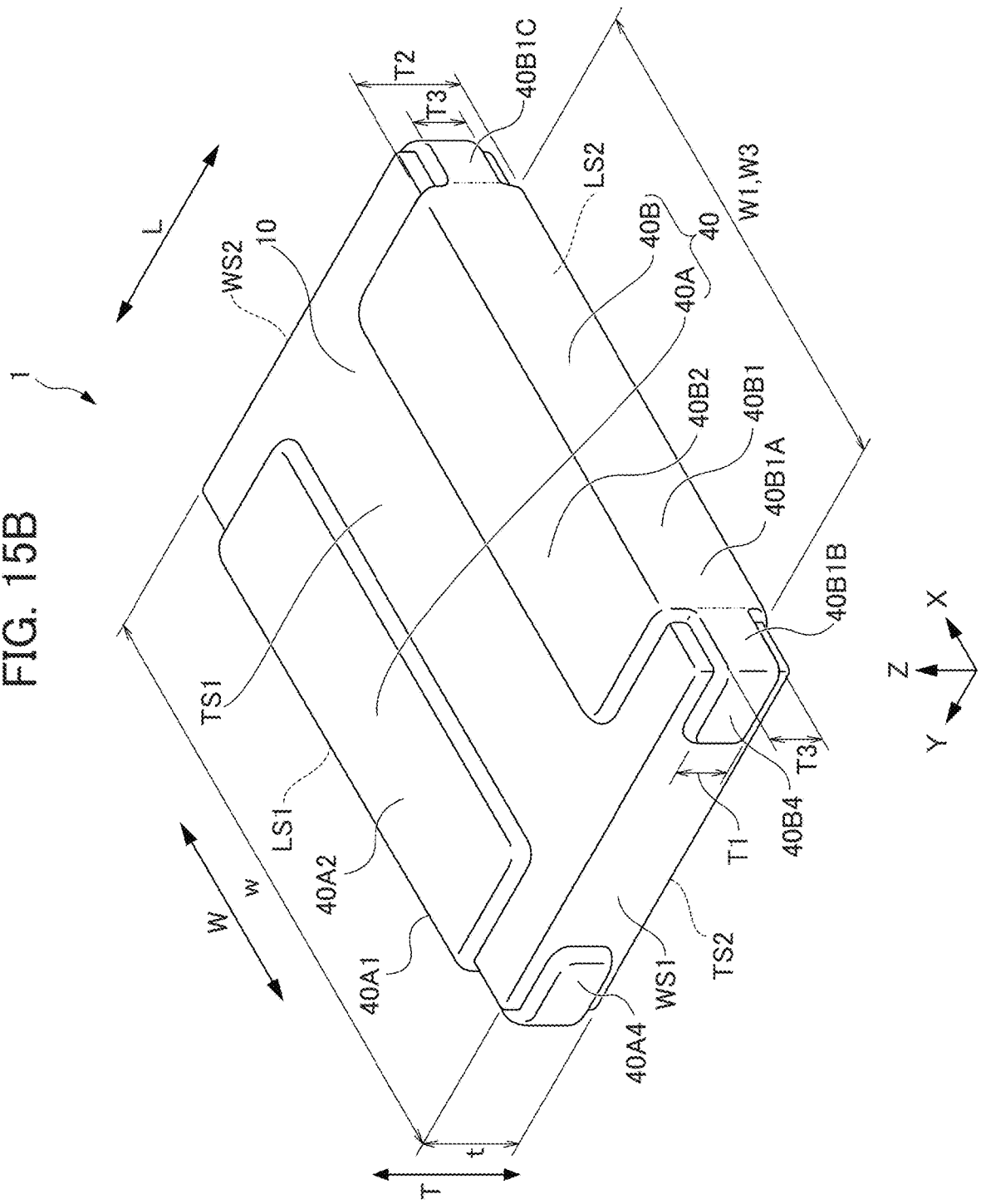
FIG. 15B is an external perspective view showing a second modified example in relation to the shape of the external electrode of the multilayer ceramic capacitor of the above preferred embodiment of the present invention, and corresponds to FIG. 1.

The configuration of the external electrode 40 is not limited to the above-described configurations. Hereinafter, descriptions are given of a second modified example in relation to the shape of the external electrode 40 of the multilayer ceramic capacitor 1 of a preferred embodiment of the present invention. In the following description, the same components as those of the above preferred embodiment are denoted by the same reference numerals, and a detailed description thereof is omitted. FIG. 15B is a cross-sectional view showing the second modified example in relation to the shape of the external electrode 40 of the multilayer ceramic capacitor 1 of a preferred embodiment of the present invention, and is a view corresponding to FIG. 1. FIG. 15C is an external perspective view of the second modified example viewed from another angle so that the first surface portion 40A1 of the first external electrode 40A can be seen.

In the present modified example, the shapes of the first surface portion 40A1 of the first external electrode 40A and the sixth surface portion 40B1 of the second external electrode 40B are different from those in the above preferred embodiments.

The first surface portion 40A1 of the present modified example includes a first middle portion 40A1A, a first extending portion 40A1B extending from the first middle portion 40A1A to the first lateral surface WS1, and a second extending portion 40A1C extending from the first middle portion 40A1A to the second lateral surface WS2.

The dimension W3 of the first middle portion 40A1A in the width direction W may be smaller than the dimension w in the width direction W of the multilayer body 10, and may be equal to the dimension W1 in the width direction W of the second surface portion 40A2 and the third surface portion 40A3 of the first external electrode 40A.

Furthermore, the dimension T2 in the height direction T of the first middle portion 40A1A is equal to or substantially equal to the dimension t of the multilayer body 10 in the height direction T, and the first middle portion 40A1A is continuously connected to the second surface portion 40A2 and the third surface portion 40A3.

The first extending portion 40A1B and the second extending portion 40A1C continuously extend from the first middle portion 40A1A to the first lateral surface WS1 and the second lateral surface WS2, respectively, and the dimension T3 in the height direction T of the first extending portion 40A1B and the second extending portion 40A1C is smaller than the dimension t in the height direction T of the multilayer body 10. In other words, at both ends of the first extending portion 40A1B and the second extending portion 40A1C in the height direction T, there exist portions where the external electrodes are not provided and the surface of the multilayer body 10 is exposed. As described above, since there are portions where a surface of the multilayer body 10 is exposed, when the multilayer ceramic capacitor 1 is mounted on the mounting board by soldering, the solder is less likely to be spread on the entire surface of the first end surface LS1, and the solder is more likely to be spread on the middle portion where the second surface portion 40A2 and the third surface portion 40A3 exist. Therefore, since it is possible to perform solder bonding with the middle portion in the width direction W of the multilayer ceramic capacitor 1 as a center, it is possible to stabilize the mountability of the multilayer ceramic capacitor 1.

The dimension T3 in the height direction T of the first extending portion 40A1B may be equal to the dimension T1 of the fourth surface portion 40A4 in the height direction T, or either one of them may be larger than the other. The dimension T3 of the second extending portion 40A1C in the height direction T may be equal to the dimension T1 of the fifth surface portion 40A5 in the height direction T, or either one of them may be larger than the other.

The sixth surface portion 40B1 of the present modified example includes a second middle portion 40B1A, a third extending portion 40B1B extending from the second middle portion 40B1A to the first lateral surface WS1, and a fourth extending portion 40B1C extending from the second middle portion 40B1A to the second lateral surface WS2.

The dimension W3 in the width direction W of the second middle portion 40B1A may be smaller than the dimension w of the multilayer body 10 in the width direction W, and may be equal to the dimension W1 of the seventh surface portion 40B2 and the eighth surface portion 40B3 of the second external electrode 40B in the width direction W.

The dimension T2 in the height direction T of the second middle portion 40B1A is equal to or substantially equal to the dimension t of the multilayer body 10 in the height direction T, and the second middle portion 40B1A is continuously connected to the seventh surface portion 40B2 and the eighth surface portion 40B3.

The third extending portion 40B1B and the fourth extending portion 40B1C continuously extend from the second middle portion 40B1A to the first lateral surface WS1 and the second lateral surface WS2, respectively, and the dimension T3 in the height direction T of the third extending portion 40B1B and the fourth extending portion 40B1C is smaller than the dimension t in the height direction T of the multilayer body 10. In other words, at both ends of the third extending portion 40B1B and the fourth extending portion 40B1C in the height direction T, there exist portions where the external electrodes are not provided and the surface of the multilayer body 10 is exposed. As described above, since there are portions where a surface of the multilayer body 10 is exposed, when the multilayer ceramic capacitor 1 is mounted on the mounting board by soldering, the solder is less likely to be spread on the entire surface of the second end surface LS2, and the solder is more likely to be spread on the middle portion where the seventh surface portion 40B2 and the eighth surface portion 40B3 exist. Therefore, since it is possible to perform solder bonding with the middle portion in the width direction W of the multilayer ceramic capacitor 1 as a center, it is possible to stabilize the mountability of the multilayer ceramic capacitor 1.

The dimension T3 in the height direction T of the third extending portion 40B1B may be equal to the dimension T1 of the ninth surface portion 40B4 in the height direction T, or either one of them may be larger than the other. The dimension T3 of the fourth extending portion 40B1C in the height direction T may be equal to the dimension T1 of the tenth surface portion 40B5 in the height direction T, or either one of them may be larger than the other.

Even with such a configuration, it is possible to reduce or prevent deterioration of the self-alignment effect, and it is possible to perform stable mounting.

Figure 15D:
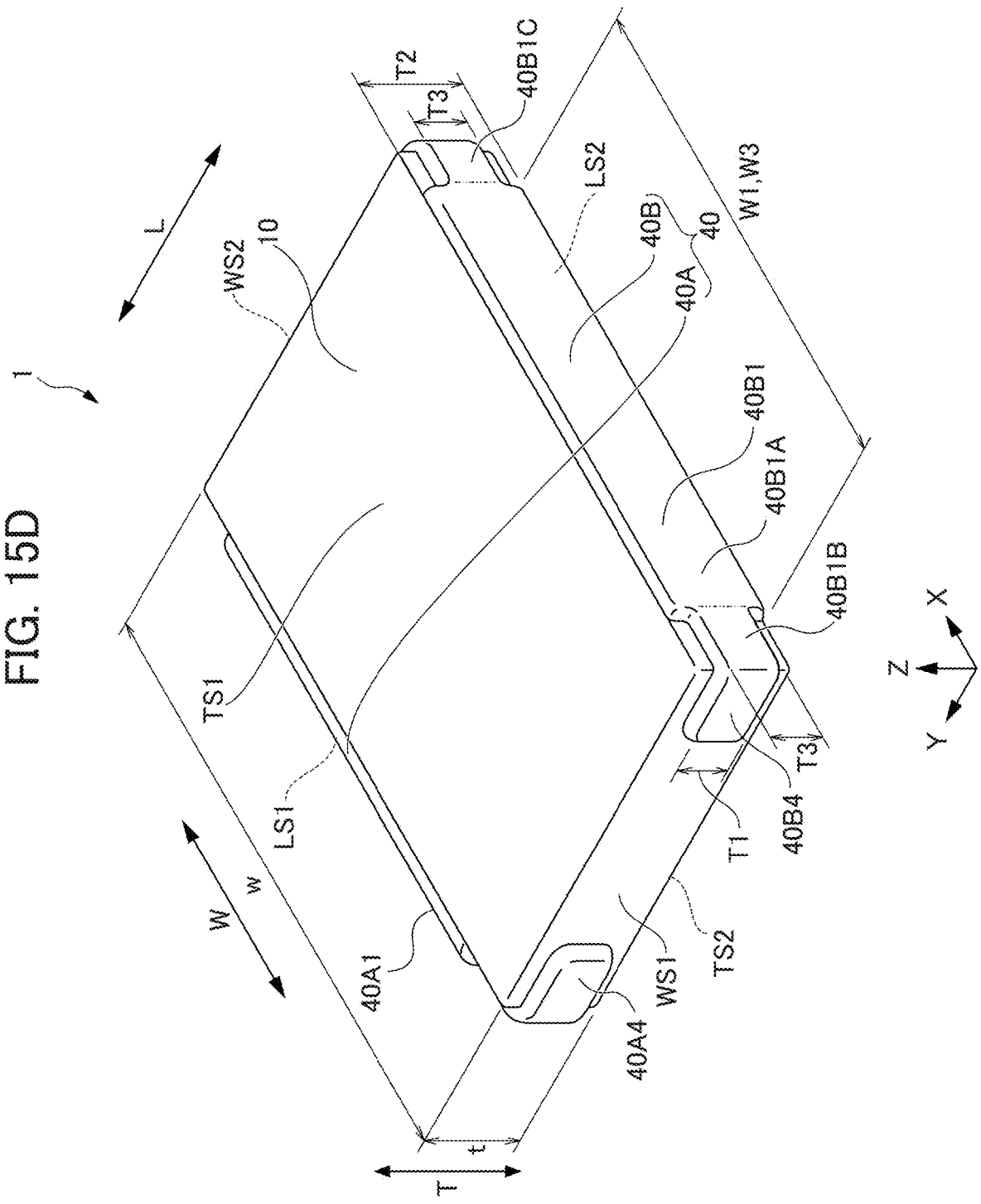
FIG. 15D is an external perspective view showing a third modified example in relation to the shape of the external electrode of the multilayer ceramic capacitor of the above preferred embodiment of the present invention, and corresponds to FIG. 15B.

The configuration of the external electrode 40 is not limited to the above-described configurations. Hereinafter, descriptions are provided of a third modified example of a preferred embodiment of the present invention in relation to the shape of the external electrode 40 of the multilayer ceramic capacitor 1 of a preferred embodiment of the present invention. In the following description, the same or corresponding components as those of the above second modified example are denoted by the same reference numerals, and a detailed description thereof is omitted. FIG. 15D is a cross-sectional view showing the third modified example in relation to the shape of the external electrode 40 of the multilayer ceramic capacitor 1 of a preferred embodiment of the present invention, and is a view corresponding to FIG. 15B.

In the present modified example, the shape of the external electrode 40 differs from that of the above second modified example. In the present modified example, the first external electrode 40A and the second external electrode 40B are provided on only one selected from the first main surface TS1 and the second main surface TS2.

For example, the first external electrode 40A of the present modified example includes the first surface portion 40A1 located on the first end surface LS1, the third surface portion 40A3 located on a portion of the second main surface TS2, the fourth surface portion 40A4 located on a portion of the first lateral surface WS1, and the fifth surface portion 40A5 located on a portion of the second lateral surface WS2. That is, the first external electrode 40A of the present modified example is not provided on the first main surface TS1.

For example, the second external electrode 40B of the present modified example includes the sixth surface portion 40B1 located on the second end surface LS2, the eighth surface portion 40B3 located on a portion of the second main surface TS2, the ninth surface portion 40B4 located on a portion of the first lateral surface WS1, and the tenth surface portion 40B5 located on a portion of the second lateral surface WS2. That is, the second external electrode 40B of the present modified example is not provided on the first main surface TS1.

Even with such a configuration, it is possible to reduce or prevent deterioration of the self-alignment effect, and it is possible to perform stable mounting. In addition, advantageous effects similar to those of the first modified example and the second modified example can be obtained.

According to the multilayer ceramic capacitor 1 of a preferred embodiment of the present invention, the following advantageous effects can be obtained.

The multilayer ceramic capacitor 1 according to a preferred embodiment of the present invention includes the multilayer body 10 including the plurality of laminated dielectric layers 20 and the internal electrode layers 30 laminated on the dielectric layers 20, the multilayer body 10 further including the first main surface TS1 and the second main surface TS2 which oppose each other in the height direction, the first end surface LS1 and the second end surface LS2 which oppose each other in the length direction perpendicular or substantially perpendicular to the height direction, and the first lateral surface WS1 and the second lateral surface WS2 which oppose each other in the width direction perpendicular or substantially perpendicular to the height direction and the length direction, the first external electrode 40A including the first surface portion 40A1 located on the first end surface LS1, at least one selected from the second surface portion 40A2 located on a portion of the first main surface TS1 and the third surface portion 40A3 located on a portion of the second main surface TS2, the fourth surface portion 40A4 located on a portion of the first lateral surface WS1, and the fifth surface portion 40A5 located on a portion of the second lateral surface WS2, and the second external electrode 40B including the sixth surface portion 40B1 located on the second end surface LS2, at least one selected from the seventh surface portion 40B2 located on a portion of the first main surface TS1 and the eighth surface portion 40B3 located on a portion of the second main surface TS2, the ninth surface portion 40B4 located on a portion of the first lateral surface WS1, and the tenth surface portion 40B5 located on a portion of the second lateral surface WS2, in which, in a case in which a dimension in the length direction between the first end surface LS1 and the second end surface LS2 of the multilayer body 10 is defined as l, a dimension in the width direction between the first lateral surface WS1 and the second lateral surface WS2 of the multilayer body 10 is defined as w, and a dimension in the height direction between the first main surface TS1 and the second main surface TS2 of the multilayer body 10 is defined as t, a dimensional relationship is established as w>l>t, in a case in which the first external electrode 40A includes the second surface portion 40A2, the dimension W1 in the width direction of the second surface portion 40A2 is smaller than the dimension W2 in the width direction of the first surface portion 40A1, in a case in which the first external electrode 40A includes the third surface portion 40A3, the dimension W1 in the width direction of the third surface portion 40A3 is smaller than the dimension W2 in the width direction of the first surface portion 40A1, in a case in which the second external electrode 40B includes the seventh surface portion 40B2, the dimension W1 in the width direction of the seventh surface portion 40B2 is smaller than the dimension W2 in the width direction of the sixth surface portion 40B1, in a case in which the second external electrode 40B includes the eighth surface portion 40B3, the dimension W1 in the width direction of the eighth surface portion 40B3 is smaller than the dimension W2 in the width direction of the sixth surface portion 40B1, the dimensions T1 of the fourth surface portion 40A4 and the fifth surface portion 40A5 of the first external electrode 40A in the height direction are smaller than the dimension T2 of the first surface portion 40A1 in the height direction, and the dimensions T1 of the ninth surface portion 40B4 and the tenth surface portion 40B5 of the second external electrode 40B in the height direction are smaller than the dimension T2 of the sixth surface portion 40B1 in the height direction. With such a configuration, it is possible to provide LW reversed type multilayer ceramic capacitors that are each able to reduce or prevent occurrence of short circuit failure.

For example, the multilayer ceramic capacitor 1 according to a preferred embodiment of the present invention includes the first external electrode 40A including the first surface portion 40A1 located on the first end surface LS1, the second surface portion 40A2 located on a portion of the first main surface TS1, the third surface portion 40A3 located on a portion of the second main surface TS2, the fourth surface portion 40A4 located on a portion of the first lateral surface WS1, and the fifth surface portion 40A5 located on a portion of the second lateral surface WS2, and the second external electrode 40B including the sixth surface portion 40B1 located on the second end surface LS2, the seventh surface portion 40B2 located on a portion of the first main surface TS1, the eighth surface portion 40B3 located on a portion of the second main surface TS2, the ninth surface portion 40B4 located on a portion of the first lateral surface WS1, and the tenth surface portion 40B5 located on a portion of the second lateral surface WS2, in which, the dimension W1 in the width direction of the second surface portion 40A2 and the third surface portion 40A3 of the first external electrode 40A may be smaller than the dimension W2 in the width direction of the first surface portion 40A1, the dimension W1 in the width direction of the seventh surface portion 40B2 and the eighth surface portion 40B3 of the second external electrode 40B may be smaller than the dimension W2 in the width direction of the sixth surface portion 40B1, the dimension T1 in the height direction of the fourth surface portion 40A4 and the fifth surface portion 40A5 of the first external electrode 40A may be smaller than the dimension T2 in the height direction of the first surface portion 40A1, and the dimension T1 in the height direction of the ninth surface portion 40B4 and the tenth surface portion 40B5 of the second external electrode 40B may be smaller than the dimension T2 in the height direction of the sixth surface portion 40B1.

For example, the multilayer ceramic capacitor 1 according to a preferred embodiment of the present invention includes the first external electrode 40A including the first surface portion 40A1 located on the first end surface LS1, the third surface portion 40A3 located on a portion of the second main surface TS2, the fourth surface portion 40A4 located on a portion of the first lateral surface WS1, and the fifth surface portion 40A5 located on a portion of the second lateral surface WS2, and the second external electrode 40B including the sixth surface portion 40B1 located on the second end surface LS2, the eighth surface portion 40B3 located on a portion of the second main surface TS2, the ninth surface portion 40B4 located on a portion of the first lateral surface WS1, and the tenth surface portion 40B5 located on a portion of the second lateral surface WS2, in which, the dimension W1 in the width direction of the third surface portion 40A3 of the first external electrode 40A may be smaller than the dimension W2 in the width direction of the first surface portion 40A1, the dimension W1 in the width direction of the eighth surface portion 40B3 of the second external electrode 40B may be smaller than the dimension W2 in the width direction of the sixth surface portion 40B1, the dimension T1 in the height direction of the fourth surface portion 40A4 and the fifth surface portion 40A5 of the first external electrode 40A may be smaller than the dimension T2 in the height direction of the first surface portion 40A1, and the dimension T1 in the height direction of the ninth surface portion 40B4 and the tenth surface portion 40B5 of the second external electrode 40B may be smaller than the dimension T2 in the height direction of the sixth surface portion 40B1.

(2) In the multilayer ceramic capacitor 1 according to a preferred embodiment of the present invention, in a case in which the first external electrode 40A includes the second surface portion 40A2, the dimension W1 in the width direction of the second surface portion 40A2 is smaller than the dimension w of the multilayer body 10, in a case in which the first external electrode 40A includes the third surface portion 40A3, the dimension W1 in the width direction of the third surface portion 40A3 is smaller than the dimension w of the multilayer body 10, in a case in which the second external electrode 40B includes the seventh surface portion 40B2, the dimension W1 in the width direction of the seventh surface portion 40B2 is smaller than the dimension w of the multilayer body 10, in a case in which the second external electrode 40B includes the eighth surface portion 40B3, the dimension W1 in the width direction of the eighth surface portion 40B3 is smaller than the dimension w of the multilayer body 10, the dimensions T1 of the fourth surface portion 40A4 and the fifth surface portion 40A5 of the first external electrode 40A in the height direction are smaller than the dimension t of the multilayer body 10, and the dimensions T1 of the ninth surface portion 40B4 and the tenth surface portion 40B5 of the second external electrode 40B in the height direction are smaller than the dimension t of the multilayer body 10. With such a configuration, it is possible to provide LW reversed type multilayer ceramic capacitors that are each able to reduce or prevent occurrence of short circuit failure and perform stable mounting.

(3) In the multilayer ceramic capacitor 1 according to a preferred embodiment of the present invention, in a case in which the first external electrode 40A includes the second surface portion 40A2, the second surface portion 40A2 has a rectangular shape, in a case in which the first external electrode 40A includes the third surface portion 40A3, the third surface portion 40A3 has a rectangular shape, in a case in which the second external electrode 40B includes the seventh surface portion 40B2, the seventh surface portion 40B2 has a rectangular shape, and in a case in which the second external electrode 40B includes the eighth surface portion 40B3, the eighth surface portion 40B3 has a rectangular shape. With such a configuration, it is possible to provide LW reversed type multilayer ceramic capacitors that are each able to reduce or prevent occurrence of short circuit failure and perform stable mounting.

(4) The dimension t in the height direction between the first main surface TS1 and the second main surface TS2 of the multilayer body 10 according to a preferred embodiment of the present invention is, for example, about 150 μm or less. Such a multilayer ceramic capacitor having a reduced height appropriately achieves the advantageous effects of the preferred embodiments of the present invention.

(5) The dimension t in the height direction between the first main surface TS1 and the second main surface TS2 of the multilayer body 10 according to a preferred embodiment of the present invention is, for example, about 100 μm or less. Such a multilayer ceramic capacitor having a reduced height appropriately achieves the advantageous effects of the preferred embodiments of the present invention.

(6) The dimension t in the height direction between the first main surface TS1 and the second main surface TS2 of the multilayer body 10 according to a preferred embodiment of the present invention is, for example, about 50 μm or less. Such a multilayer ceramic capacitor having a reduced height appropriately achieves the advantageous effects of the preferred embodiments of the present invention.

(7) In the multilayer ceramic capacitor 1 according to a preferred embodiment of the present invention, the internal electrode layers 30 each include the first internal electrode layer 31 and the second internal electrode layer 32, the first internal electrode layer 31 includes the first counter electrode portion 31A that is located in the multilayer body and is opposed to the second internal electrode layer 32, and the first extension portion 31B that is connected to the first counter electrode portion 31A and is exposed at the first end surface LS1, a portion of the first lateral surface WS1, and a portion of the second lateral surface WS2, and the second internal electrode layer 32 includes the second counter electrode portion 32A that is located in the multilayer body and is opposed to the first internal electrode layer 31, and the second extension portion 32B that is connected to the second counter electrode portion 32A and is exposed at the second end surface LS2, a portion of the first lateral surface WS1, and a portion of the second lateral surface WS2. With such a configuration, it is possible to shorten the distance between the first extension portion of the first internal electrode layer 31 and the second extension portion of the second internal electrode layer 32. This configuration makes it possible to shorten the path through which current flows. With such a configuration, it is possible to reduce the ESL.

(8) In the multilayer ceramic capacitor 1 according to a preferred embodiment of the present invention, the first external electrode 40A includes the first base electrode layer 50A and the first plated layer 60A on the first base electrode layer 50A, the second external electrode 40B includes the second base electrode layer 50B and the second plated layer 60B on the second base electrode layer 50B, and the first base electrode layer 50A and the second base electrode layer 50B are each a sputtered electrode. With such a configuration, it is possible to provide thinner external electrodes. This gives a structure that further secures the thickness of the multilayer body 10, such that it is possible to secure the capacitance and the strength of the multilayer body 10.

Experimental Examples

Multilayer ceramic capacitors were produced as samples of Experimental Examples of preferred embodiments of the present invention, and evaluation for mountability and evaluation for capacitance and the thickness of base electrode layer were performed.

First, as samples in the Examples, multilayer ceramic capacitors 1 having the following specifications shown in FIGS. 1 to 10B were manufactured according to the above-described manufacturing method. Furthermore, as a sample of Comparative Example 1, a multilayer ceramic capacitor 101 in which an external electrode 140 (a first external electrode 140A and a second external electrode 140B) includes a normal structure shown in FIG. 16A was produced. As a sample of Comparative Example 2, a multilayer ceramic capacitor 201 in which an external electrode 240 (a first external electrode 240A and a second external electrode 240B) includes recess portions R each recessed from the end edge of the external electrode toward the end surface of the multilayer body 10 shown in FIG. 17A was produced.

Figure 16A:
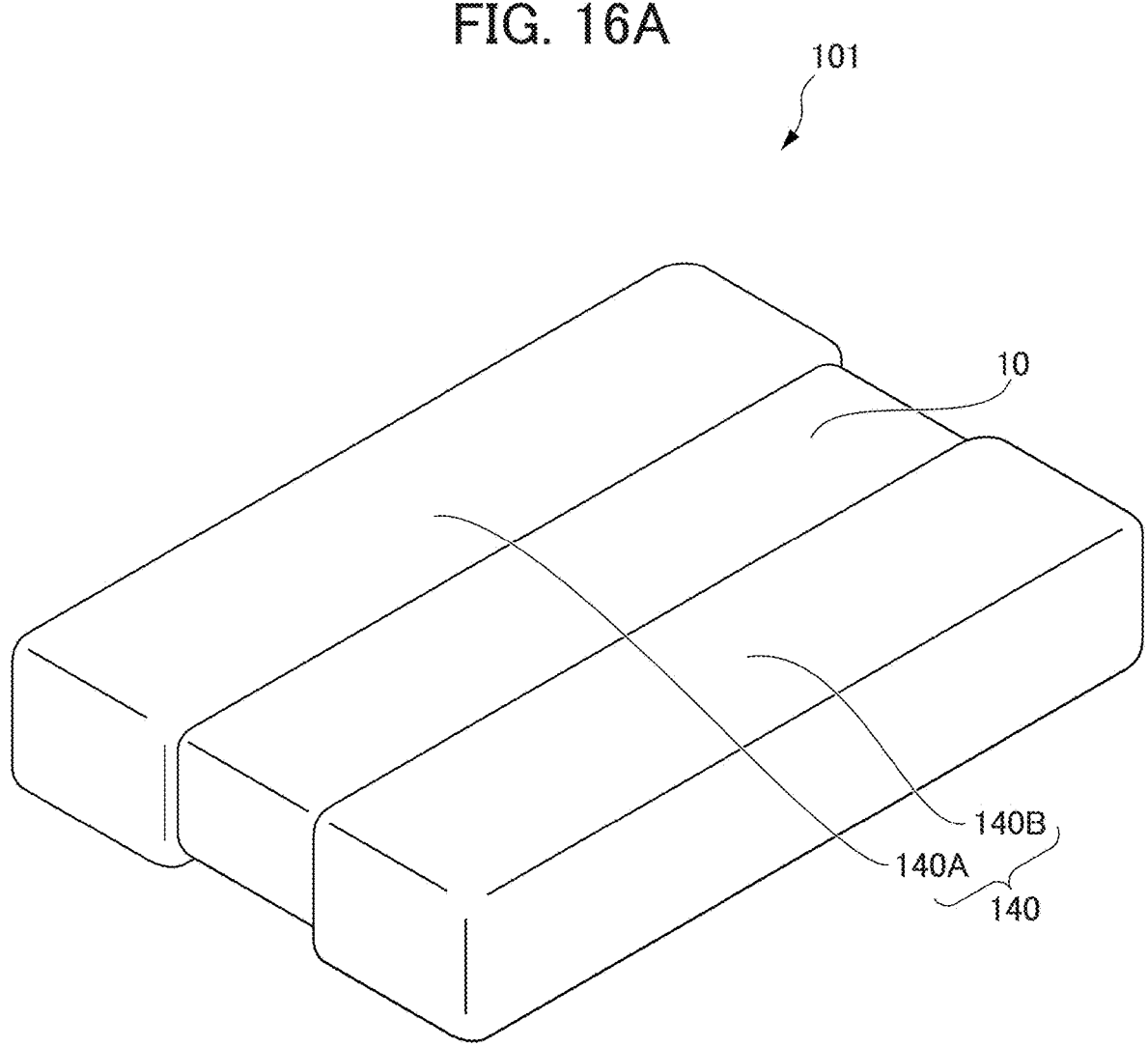
FIG. 16A is an external perspective view of a multilayer ceramic capacitor of Comparative Example 1, and is a view corresponding to FIG. 1.
Figure 16B:
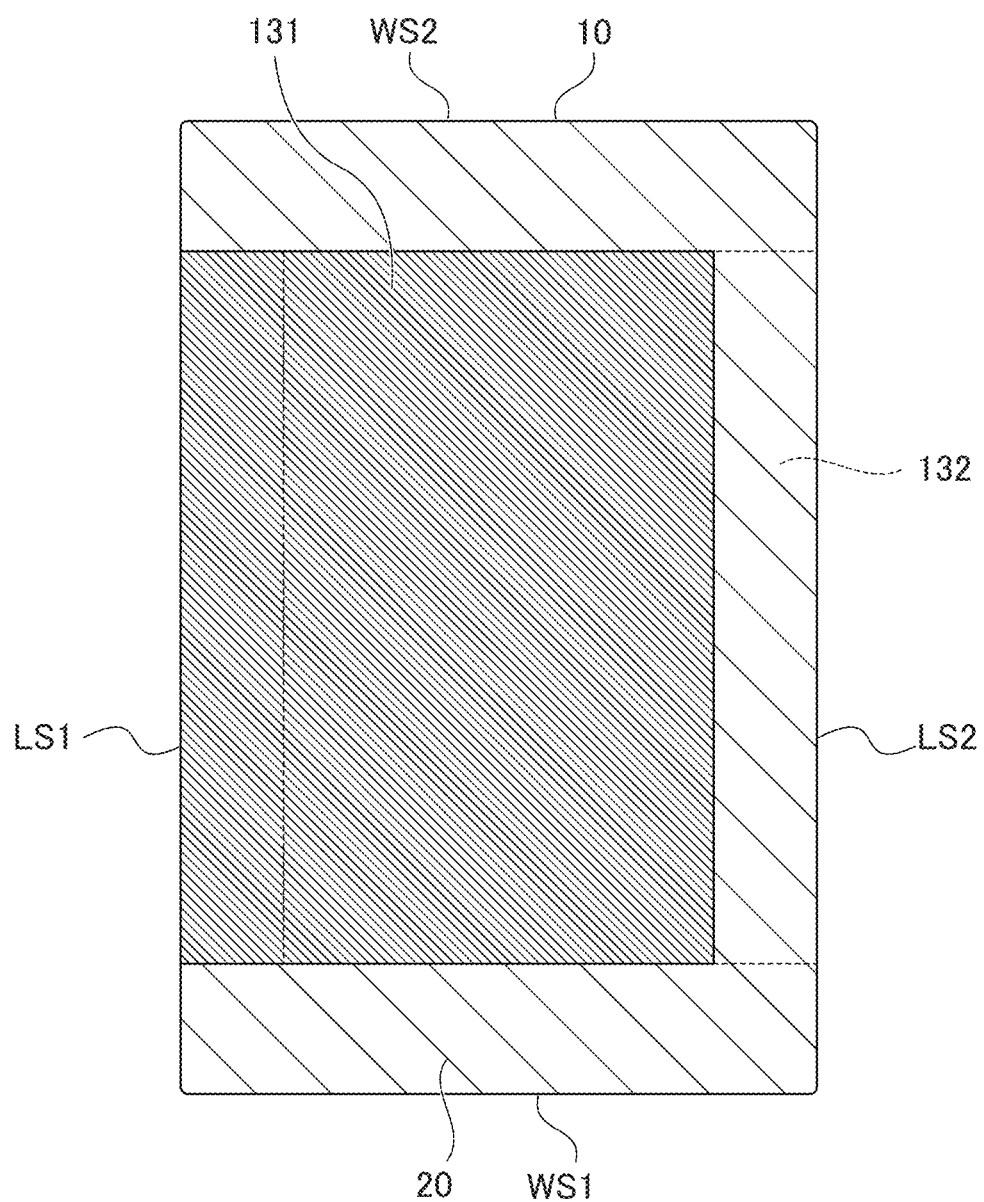
FIG. 16B is a diagram of a first internal electrode layer of the multilayer ceramic capacitor of the Comparative Example, and is a view corresponding to FIG. 8A.
Figure 16C:
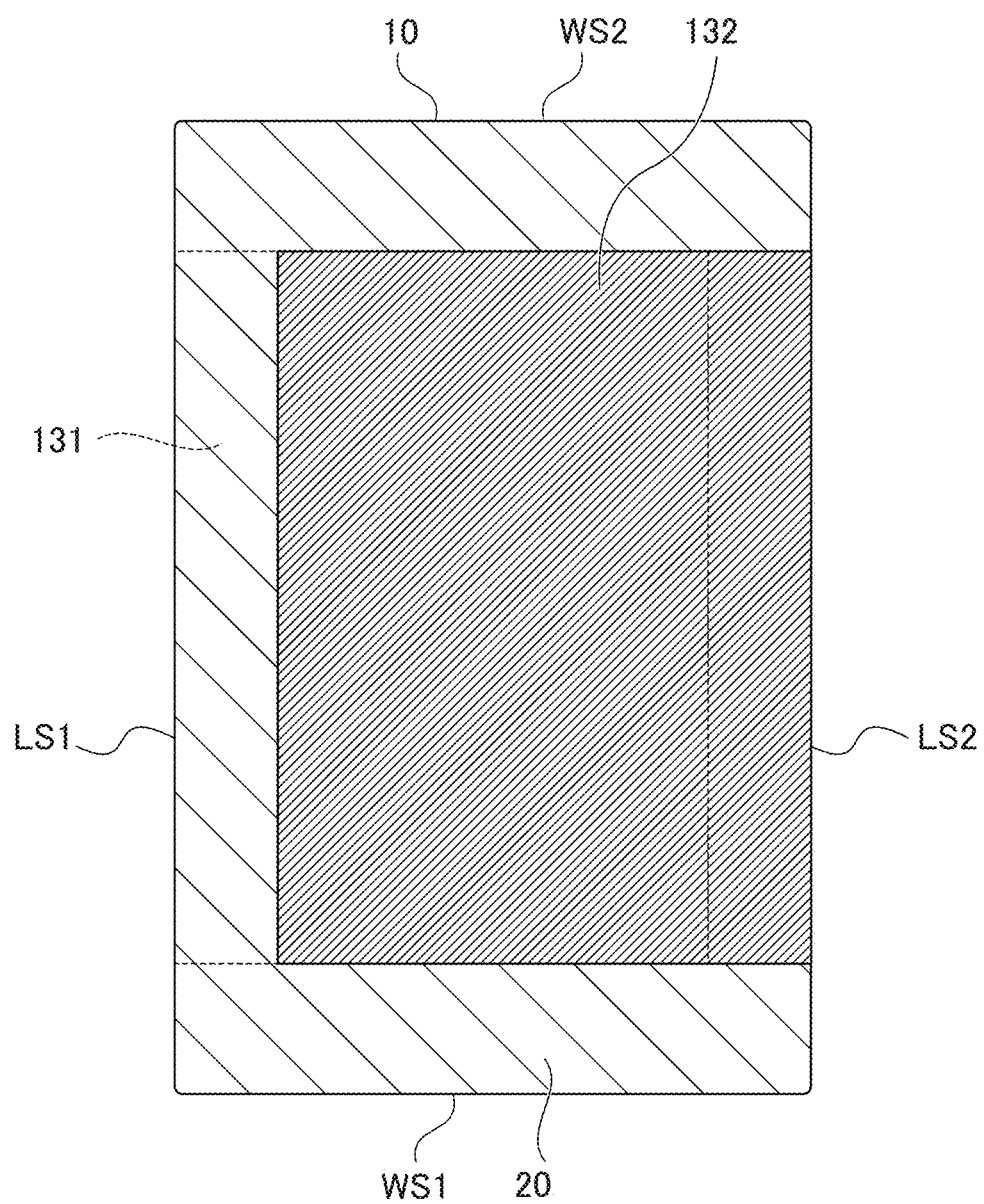
FIG. 16C is a diagram of a second internal electrode layer of the multilayer ceramic capacitor of the Comparative Example, and is a view corresponding to FIG. 8B.
Figure 17B:
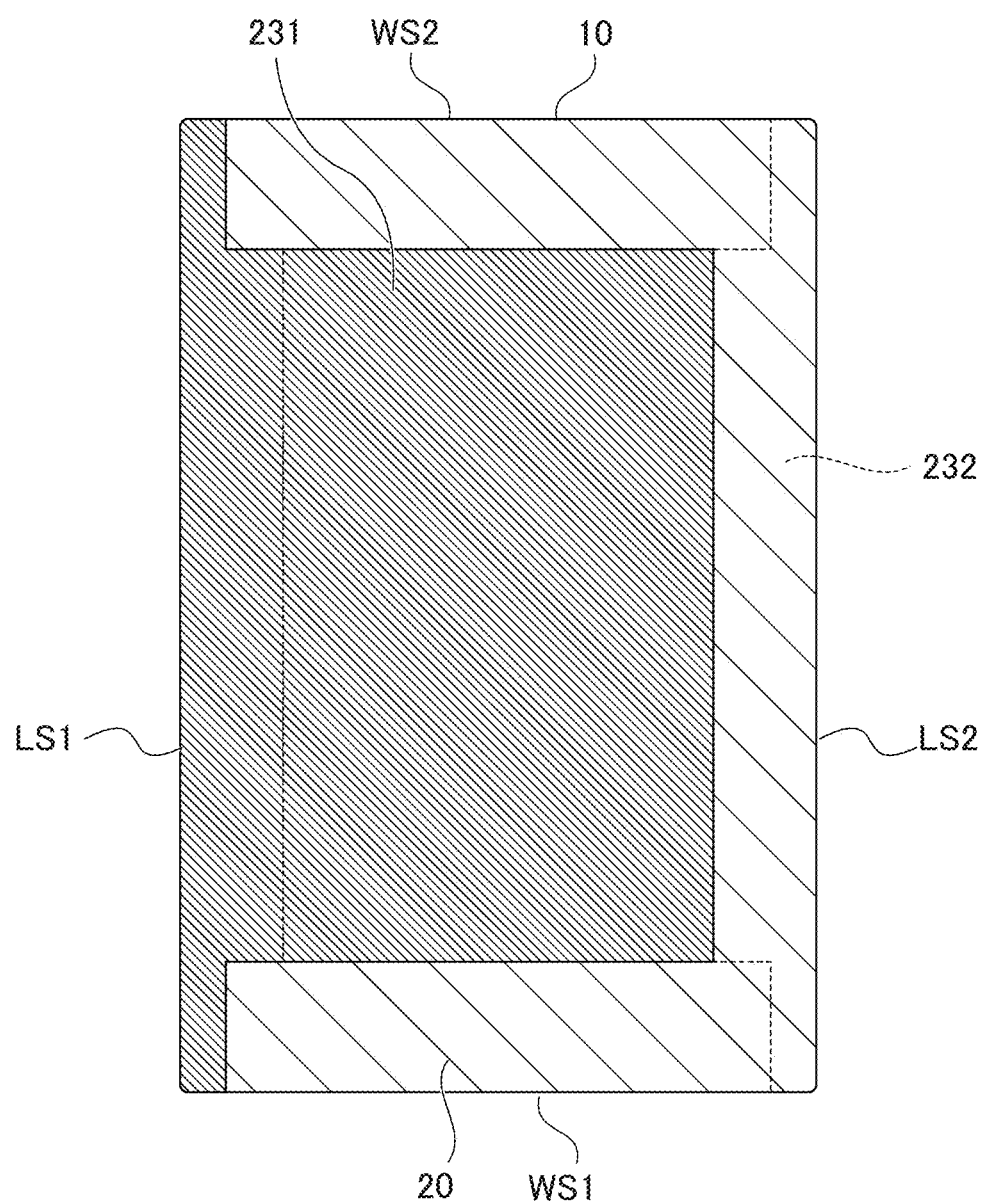
FIG. 17B is a diagram of a first internal electrode layer of the multilayer ceramic capacitor of the Comparative Example, and is a view corresponding to FIG. 8A.
Figure 17C:
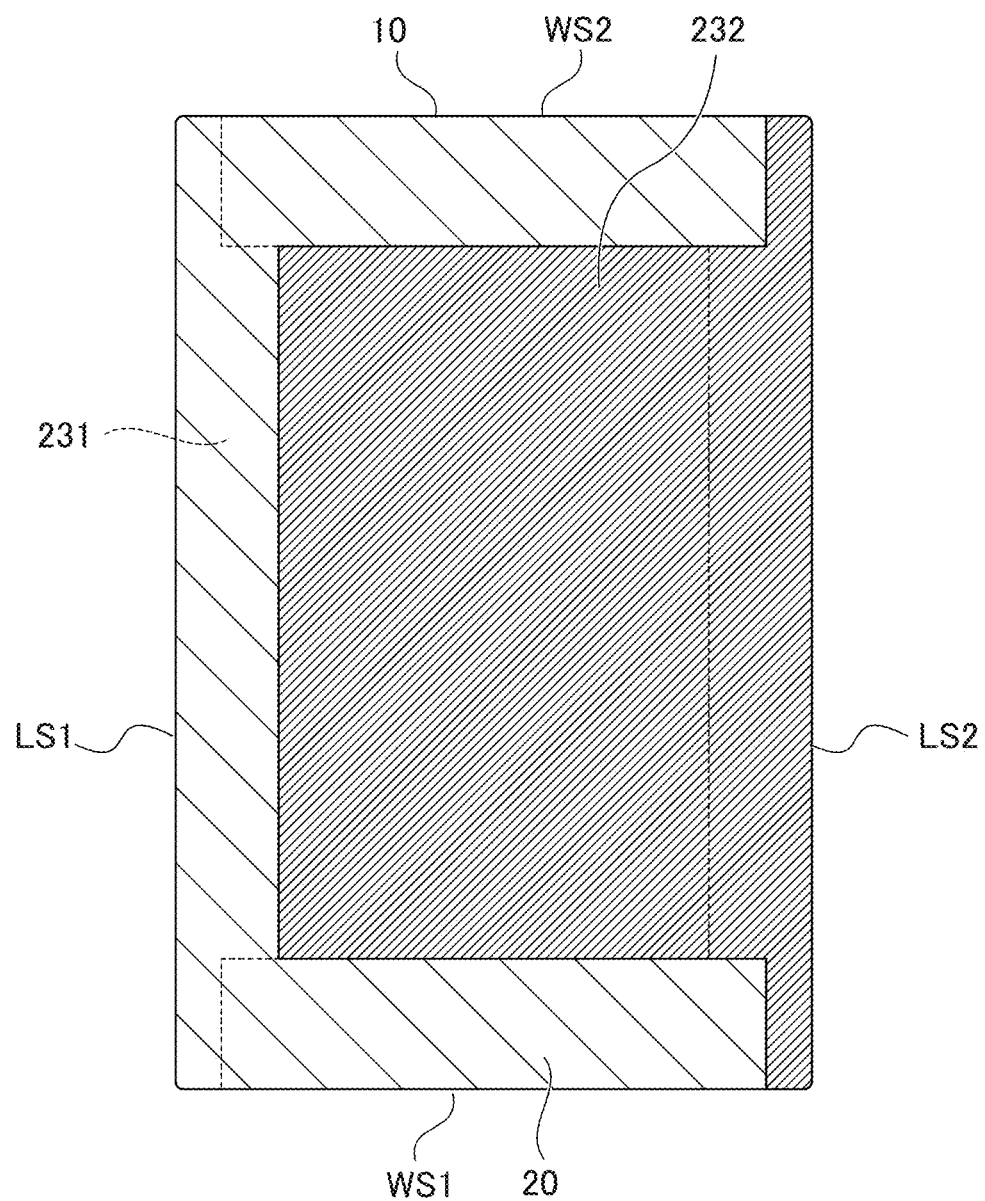
FIG. 17C is a diagram showing a second internal electrode layer of the multilayer ceramic capacitor of the Comparative Example, and corresponds to FIG. 8B.

FIG. 16A is an external perspective view of the multilayer ceramic capacitor 101 of Comparative Example 1, and corresponds to FIG. 1. FIG. 16B is a view of a first internal electrode layer 131 of the multilayer ceramic capacitor 101 of Comparative Example 1, and corresponds to FIG. 8A. FIG. 16C is a view of a second internal electrode layer 132 of the multilayer ceramic capacitor 101 of Comparative Example 1, and corresponds to FIG. 8B. FIG. 17A is an external perspective view of the multilayer ceramic capacitor 201 of Comparative Example 2, and corresponds to FIG. 1. FIG. 17B is a view of a first internal electrode layer 231 of the multilayer ceramic capacitor 201 of Comparative Example 2, and corresponds to FIG. 8A. FIG. 17C is a view of a second internal electrode layer 232 of the multilayer ceramic capacitor 201 of Comparative Example 2, and corresponds to FIG. 8B. It should be noted that the external electrode is omitted in FIG. 16B, FIG. 16C, FIG. 17B, and FIG. 17C.

Configuration of Example

Dimensions of multilayer ceramic capacitor: L×W×T=about 0.520 mm×about 1.000 mm×about 0.100 mm
Dimensions of multilayer body: L×W×T=about 0.500 mm×about 0.980 mm×about 0.070 mm
Ceramic material of dielectric layer: $BaTiO_3$
Capacitance: about 0.47 µF
Rated voltage: about 4 V
Material of internal electrode layer: nickel
Pattern of internal electrode layer: pattern shown in FIGS. 8A and 8B
Structure of external electrode:
Base Electrode Layer: Thin Film Layer (Sputtered Electrode)
  Material of base electrode layer: two-layer structure of NiCr layer and NiCu layer
  Thickness of base electrode layer: main surface thickness of about 0.2 µm (thickness of base electrode layer provided in each of first main surface TS1 and second main surface TS2)
  Plated layer: three-layer structure of Cu plating, Ni plating, and Sn plating
  Cu plating thickness: about 5.5 µm
  Ni plating thickness: about 2.5 µm
  Sn plating thickness: about 3.2 µm
  The dimension W1 in the width direction W of each of the second surface portion 40A2 and the third surface portion 40A3 of the first external electrode 40A is about 87% of the dimension w in the width direction W of the multilayer body 10 (the dimension W1 in the width direction W of the second surface portion 40A2 and the third surface portion 40A3 is about 0.85 mm, and the dimension w of the multilayer body 10 is about 0.980 mm).
  The dimension L1 in the length direction L of each of the second surface portion 40A2 and the third surface portion 40A3 of the first external electrode 40A is about 30% of the dimension l in the length direction L of the multilayer body 10 (the dimension L1 in the length direction L of the second surface portion 40A2 and the third surface portion 40A3 is about 0.15 mm, and the dimension l of the multilayer body 10 is about 0.500 mm).
  The dimension W1 in the width direction W of each of the seventh surface portion 40B2 and the eighth surface portion 40B3 of the second external electrode 40B is about 87% of the dimension w in the width direction W of the multilayer body 10 (the dimension W1 in the width direction W of the seventh surface portion 40B2 and the eighth surface portion 40B3 is about 0.85 mm, and the dimension w of the multilayer body 10 is about 0.980 mm).
  The dimension L1 in the length direction L of each of the seventh surface portion 40B2 and the eighth surface portion 40B3 of the second external electrode 40B is about 30% of the dimension l in the length direction L of the multilayer body 10 (the dimension L1 in the length direction L of the seventh surface portion 40B2 and the eighth surface portion 40B3 is about 0.15 mm, and the dimension l of the multilayer body 10 is about 0.500 mm).
  The dimension T1 in the height direction T of each of the fourth surface portion 40A4 and the fifth surface portion 40A5 of the first external electrode 40A is about 69% of the dimension t in the height direction T of the multilayer body 10 (the dimension T1 in the height direction T of the fourth surface portion 40A4 and the fifth surface portion 40A5 is about 0.048 mm, and the dimension t of the multilayer body 10 is about 0.070 mm).
  The dimension L2 in the length direction L of each of the fourth surface portion 40A4 and the fifth surface portion 40A5 of the first external electrode 40A is about 20% of the dimension l in the length direction L of the multilayer body 10 (the dimension L2 in the length direction L of the fourth surface portion 40A4 and the fifth surface portion 40A5 is about 0.1 mm, and the dimension l of the multilayer body 10 is about 0.500 mm).
  The dimension T1 in the height direction T of each of the ninth surface portion 40B4 and the tenth surface portion 40B5 of the second external electrode 40B is about 69% of the dimension t in the height direction T of the multilayer body 10 (the dimension T1 in the height direction T of the ninth surface portion 40B4 and the tenth surface portion 40B5 is about 0.048 mm, and the dimension t of the multilayer body 10 is about 0.070 mm).
  The dimension L2 in the length direction L of each of the ninth surface portion 40B4 and the tenth surface portion 40B5 of the second external electrode 40B is about 20% of the dimension l in the length direction L of the multilayer body 10 (the dimension L2 in the length direction L of the ninth surface portion 40B4 and the tenth surface portion 40B5 is about 0.1 mm, and the dimension l of the multilayer body 10 is about 0.500 mm).
Configuration of Comparative Example 1
  Dimensions of multilayer ceramic capacitor: L×W×T=about 0.520 mm×about 1.000 mm×about 0.100 mm
  Ceramic material of dielectric layer: $BaTiO_3$
  Capacitance: about 0.47 µF
  Rated voltage: about 4 V
  Material of internal electrode layer: nickel
  Pattern of internal electrode layer: pattern shown in FIG. 16B and FIG. 16C
  Structure of external electrode:
  Base electrode layer: fired layer obtained by applying conductive paste thereto and firing
  Material of base electrode layer: nickel
  Thickness of base electrode layer: end surface thickness of about 10 µm, lateral surface thickness of about 5 µm, main surface thickness of about 5 µm (thickness of base electrode layer provided in each of first main surface TS1 and second main surface TS2)
  Plated layer: three-layer structure of Cu plating, Ni plating, and Sn plating
  Cu plating thickness: about 5.5 µm
  Ni plating thickness: about 2.5 µm
  Sn plating thickness: about 3.2 µm
Configuration of Comparative Example 2
  Dimensions of multilayer ceramic capacitor: L×W×T=about 0.520 mm×about 1.000 mm×about 0.100 mm
  Ceramic material of dielectric layer: $BaTiO_3$ Capacitance: about 0.47 μF
Rated voltage: about 4 V
Material of internal electrode layer: nickel
Pattern of internal electrode layer: pattern shown in FIG. 17B and FIG. 17C
Structure of external electrode:
Base electrode layer: thin film layer (sputtered electrode)
Material of base electrode layer: two layers of NiCr layer and NiCu layer
Thickness of base electrode layer: main surface thickness of about 0.2 μm (thickness of base electrode layer provided in each of first main surface TS1 and second main surface TS2)
Plated layer: three-layer structure of Cu plating, Ni plating, and Sn plating
Cu plating thickness: about 5.5 μm
Ni plating thickness: about 2.5 μm
Sn plating thickness: about 3.2 μm Next, mountability was evaluated using the prepared samples.

Mountability Evaluation

Samples of the Example and samples of Comparative Examples 1 and 2 were used to evaluate the mounting properties. Evaluation was performed using 100 samples each. Table 1 shows the results of the evaluation in relation to the mountability.

TABLE 1

|  | ROTATION | SHORT CIRCUIT |
| --- | --- | --- |
| EXAMPLE | 0/100 | 0/100 |
| COMPARATIVE EXAMPLE 1 | 1/100 | 0/100 |
| COMPARATIVE EXAMPLE 2 | 8/100 | 1/100 |

In Comparative Example 1, rotation failure occurred in one sample. In Comparative Example 2, rotation failure occurred in eight samples. One of the eight samples rotated greatly, and was mounted so that one external electrode straddled lands of different polarity, and a short-circuit failure occurred. In the samples of Comparative Example 2, it is considered that the variation in area and shape of the external electrode covering the ridges of the first lateral surface portion and the second lateral surface portion of the multilayer body occurred due to the variation in formation position and thickness of the base electrode layer and the plated layer provided on the base electrode layer, such that the wetting manner of the solder with respect to the external electrode of the first lateral surface portion and the second lateral surface portion is likely to vary, and the wetting amount of the solder may vary greatly. As a result, it is assumed that a difference occurred in the manner in which the tensile stress of the solder was applied to the multilayer ceramic capacitor, and a rotation failure occurred.

The evaluation method in this experimental example is shown below.

Evaluation Method for Mountability

Figure 18A:
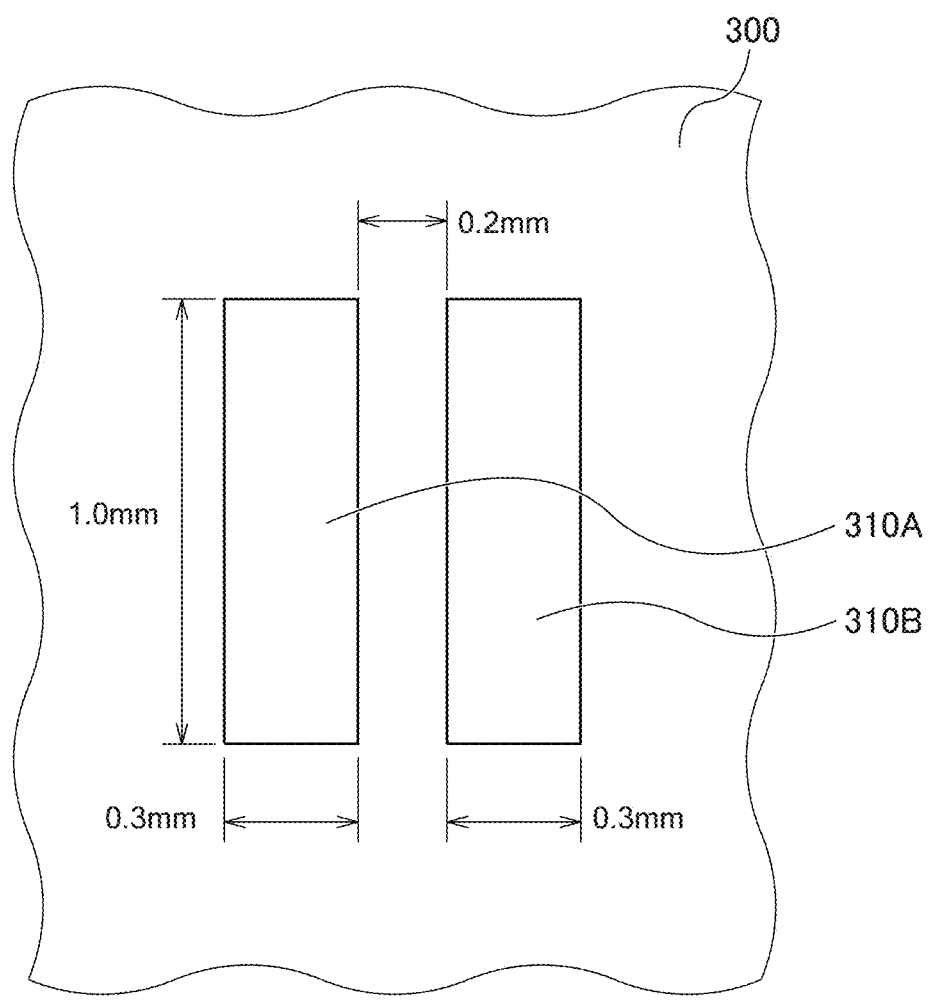
FIG. 18A is a diagram explaining how the mountability of Experimental Example is evaluated.

FIGS. 18A to 18D are diagrams explaining methods of evaluating the mountability. First, solder (solder composition Sn-3.0, Ag-0.5Cu) was printed on each of two lands 310A and 310B provided on a glass-epoxy substrate 300 shown in FIG. 18A. At this time, solder of the amount having thickness of 100 μm was printed for each land. As shown in FIG. 18A, the dimension in the width direction of the land was about 1.0 mm, the dimension in the length direction of the land was about 0.3 mm, and the distance between the two lands was about 0.2 mm.

Figure 18B:
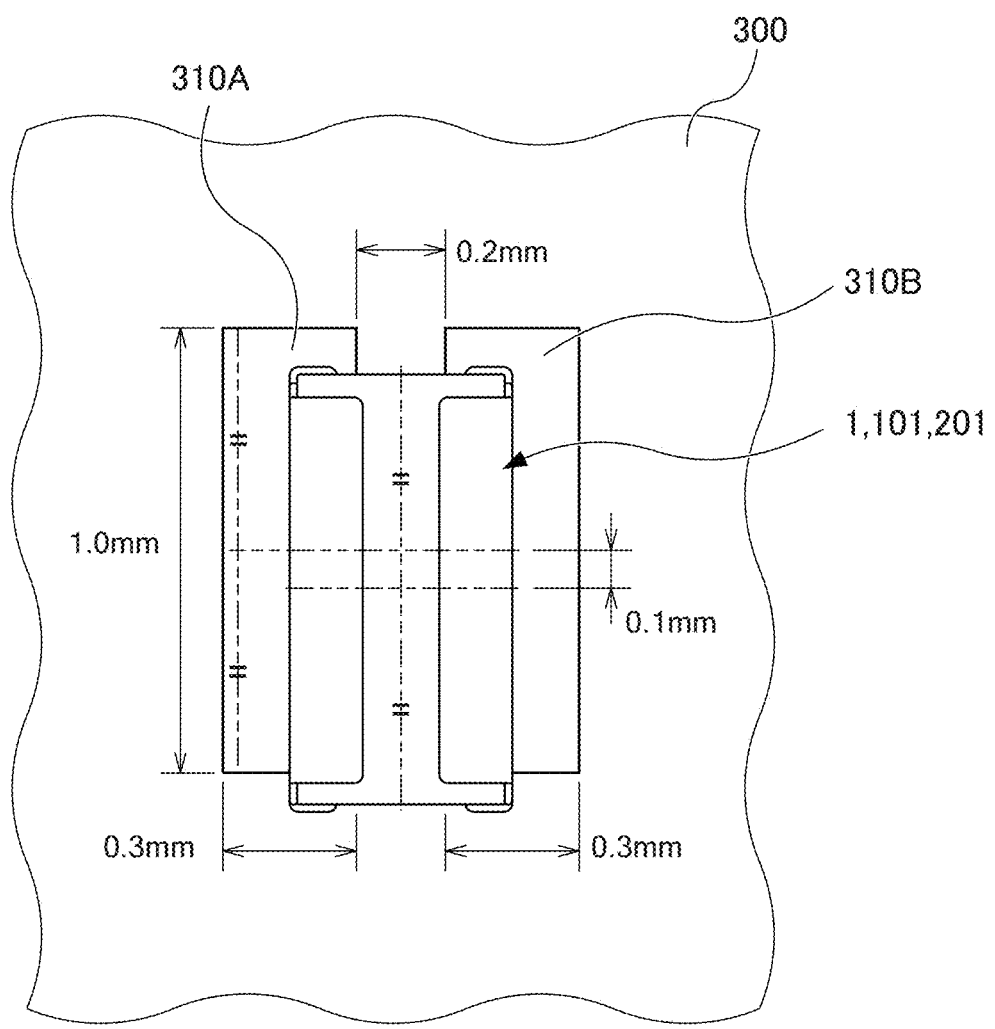
FIG. 18B is a diagram explaining how the mountability of Experimental Example is evaluated.
Figure 18C:
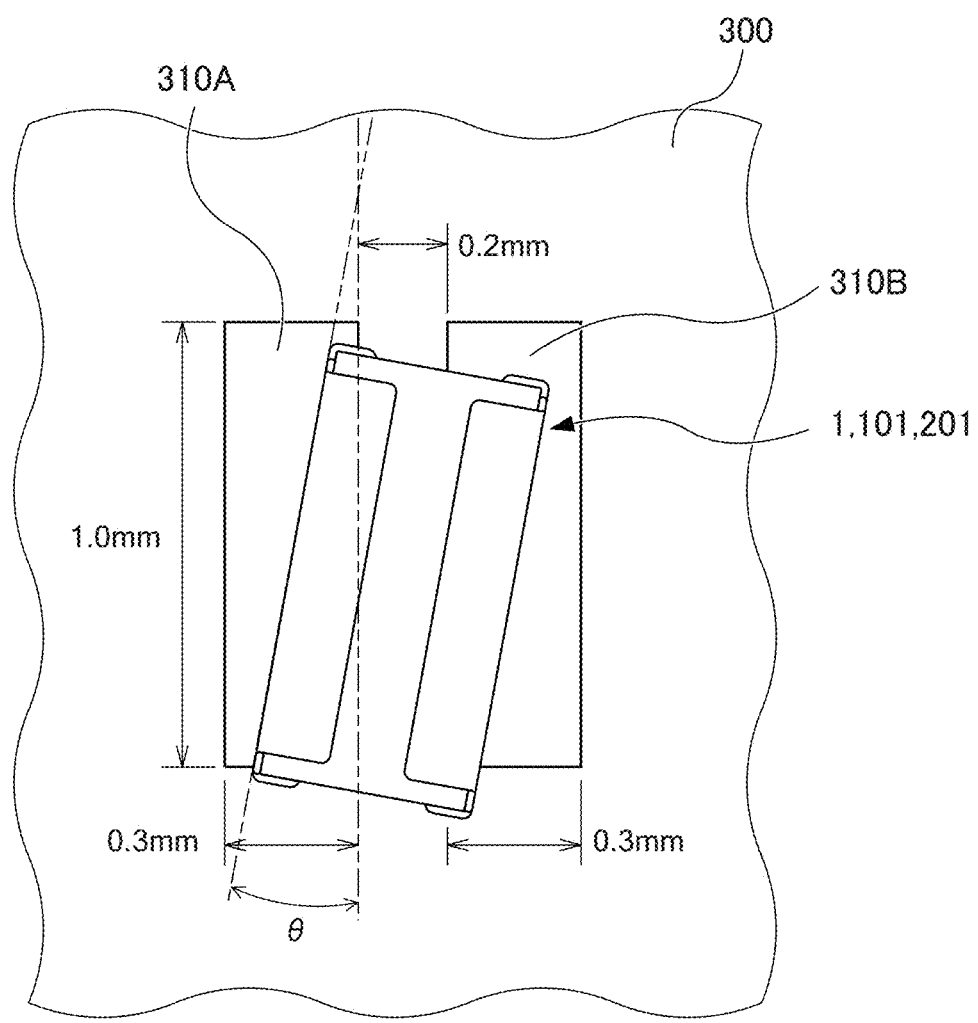
FIG. 18C is a diagram explaining how the mountability of Experimental Example is evaluated.

The multilayer ceramic capacitor was then placed on the solder-coated lands. At this time, as shown in FIG. 18B, in the middle of the land in the dimension of width direction, a reference line was assumed so as to be perpendicular or substantially perpendicular to the width direction of the land, and the multilayer ceramic capacitor was placed so that the middle in the width direction W of the multilayer ceramic capacitor was positioned at a position about 0.1 mm away from the reference line in the width direction of the land. At this time, placing was done so that the angle θ formed by the multilayer ceramic capacitor with the land shown in FIG. 18C, that is, the angle θ formed by the acute angle between one of the opposing inner sides of the two lands and the surface on first end surface LS1 side or the second end surface LS2 side of the external electrode of the multilayer ceramic capacitor was about 5° or less.

Figure 18D:
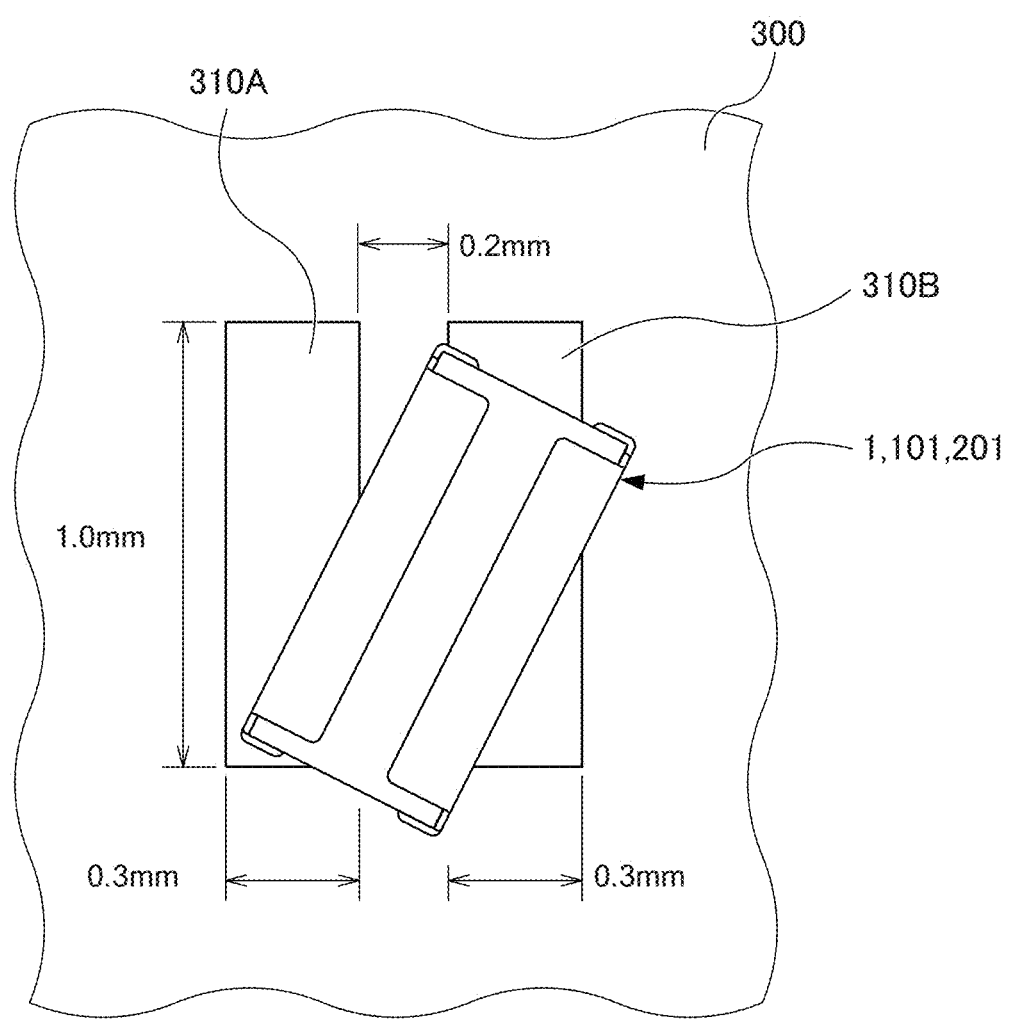
FIG. 18D is a diagram explaining how the mountability of Experimental Example is evaluated.

Thereafter, the external electrode of the multilayer ceramic capacitor was solder-bonded to the land by reflow soldering, and the multilayer ceramic capacitor was mounted on the board. After mounting, the mounting condition of the multilayer ceramic capacitor was observed, and a state in which the angle θ formed by the land and the multilayer ceramic capacitor was inclined by about 5° or more was evaluated as rotation failure. Furthermore, as shown in FIG. 18D, the multilayer ceramic capacitor greatly rotated and was mounted to cause the first external electrode or the second external electrode so as to straddle the two lands. This was evaluated as short-circuit failure.

From the above results, according to the multilayer ceramic capacitor 1 of a preferred embodiment of the present invention, it is possible to reduce or prevent solder wetting on the first lateral surface WS1 and the second lateral surface WS2 of the multilayer body 10, such that it is possible to reduce or prevent the stress applied in the rotational direction of the multilayer ceramic capacitor 1. Therefore, the self-alignment effect is improved, and the mountability of the multilayer ceramic capacitor 1 is stabilized. As a result, it is possible to prevent short-circuit failure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including a plurality of laminated dielectric layers and a plurality of internal electrode layers laminated on the dielectric layers, a first main surface and a second main surface which oppose each other in a height direction, a first end surface and a second end surface which oppose each other in a length direction perpendicular or substantially perpendicular to the height direction, and a first lateral surface and a second lateral surface which oppose each other in a width direction perpendicular or substantially perpendicular to the height direction and the length direction;
a first external electrode including a first surface portion located on the first end surface, at least one of a second surface portion located on a portion of the first main surface and a third surface portion located on a portion of the second main surface, a fourth surface portion located on a portion of the first lateral surface, and a fifth surface portion located on a portion of the second lateral surface; and a second external electrode including a sixth surface portion located on the second end surface, at least one of a seventh surface portion located on a portion of the first main surface and an eighth surface portion located on a portion of the second main surface, a ninth surface portion located on a portion of the first lateral surface, and a tenth surface portion located on a portion of the second lateral surface; wherein where a dimension in the length direction between the first end surface and the second end surface of the multilayer body is defined as l, a dimension in the width direction between the first lateral surface and the second lateral surface of the multilayer body is defined as w, and a dimension in the height direction between the first main surface and the second main surface of the multilayer body is defined as t, a dimensional relationship of w>l>t is established;

where the first external electrode includes the second surface portion, a dimension in the width direction of the second surface portion is smaller than a dimension in the width direction of the first surface portion;

dimensions in the height direction of the fourth surface portion and the fifth surface portion of the first external electrode are smaller than a dimension in the height direction of the first surface portion;

where the second external electrode includes the seventh surface portion, a dimension in the width direction of the seventh surface portion is smaller than a dimension in the width direction of the sixth surface portion;

dimensions of the ninth surface portion and the tenth surface portion of the second external electrode in the height direction are smaller than a dimension of the sixth surface portion in the height direction;

on the first main surface, a surface of the multilayer body is exposed at a region located between the second surface portion and the fourth surface portion; and each of the second surface portion of the first external electrode and the seventh surface portion of the second external electrode is continuously provided in the width direction on the first main surface, and each of the second surface portion of the first external electrode and the seventh surface portion of the second external electrode does not reach ridges of the multilayer body that are opposed to each other in the width direction of the multilayer body.

2. The multilayer ceramic capacitor according to claim 1, wherein
the dimension in the width direction of the second surface portion is smaller than a dimension w of the multilayer body;
the dimension in the width direction of the seventh surface portion is smaller than the dimension w of the multilayer body;
the dimensions of the fourth surface portion and the fifth surface portion of the first external electrode in the height direction are smaller than a dimension t of the multilayer body; and
the dimensions of the ninth surface portion and the tenth surface portion of the second external electrode in the height direction are smaller than the dimension t of the multilayer body.

3. The multilayer ceramic capacitor according to claim 1, wherein
the second surface portion has a rectangular shape; and
the seventh surface portion has a rectangular shape.

4. The multilayer ceramic capacitor according to claim 3, wherein a total dimension in the width direction of the second surface portion and the third surface portion of the first external electrode is about 80% or more and about 95% or less of a total dimension of the multilayer body in the width direction.

5. The multilayer ceramic capacitor according to claim 3, wherein a total dimension in the length direction of the second surface portion and the third surface portion of the first external electrode is about 20% or more and about 40% or less of a total dimension of the multilayer body in the length direction.

6. The multilayer ceramic capacitor according to claim 3, wherein a total dimension in the width direction of the seventh surface portion and the eighth surface portion of the second external electrode is about 80% or more and about 95% or less of a total dimension of the multilayer body in the width direction.

7. The multilayer ceramic capacitor according to claim 3, wherein a total dimension in the length direction of the seventh surface portion and the eighth surface portion of the second external electrode is about 20% or more and about 40% or less of a total dimension of the multilayer body in the length direction.

8. The multilayer ceramic capacitor according to claim 3, wherein a total dimension in the height direction of the fourth surface portion and the fifth surface portion of the first external electrode is about 40% or more and about 80% or less of a total dimension of the multilayer body in the height direction.

9. The multilayer ceramic capacitor according to claim 3, wherein a total dimension in the length direction of the fourth surface portion and the fifth surface portion of the first external electrode is about 4% or more and about 40% or less of a total dimension of the multilayer body in the length direction.

10. The multilayer ceramic capacitor according to claim 3, wherein a total dimension in the height direction of the ninth surface portion and the tenth surface portion of the second external electrode is about 40% or more and about 80% or less of a total dimension of the multilayer body in the height direction.

11. The multilayer ceramic capacitor according to claim 1, wherein a dimension in the height direction between the first main surface and the second main surface of the multilayer body is about 150 μm or less.

12. The multilayer ceramic capacitor according to claim 1, wherein a dimension in the height direction between the first main surface and the second main surface of the multilayer body is about 100 μm or less.

13. The multilayer ceramic capacitor according to claim 1, wherein a dimension in the height direction between the first main surface and the second main surface of the multilayer body is about 50 μm or less.

14. The multilayer ceramic capacitor according to claim 1, wherein
the internal electrode layers each include a first internal electrode layer and a second internal electrode layer;
the first internal electrode layer includes a first counter electrode portion located in the multilayer body and opposed to the second internal electrode layer, and a first extension portion connected to the first counter electrode portion and exposed at the first end surface, a portion of the first lateral surface, and a portion of the second lateral surface; and
the second internal electrode layer includes a second counter electrode portion located in the multilayer body and opposed to the first internal electrode layer, and a second extension portion connected to the second counter electrode portion and exposed at the second end surface, a portion of the first lateral surface, and a portion of the second lateral surface.

15. The multilayer ceramic capacitor according to claim 14, wherein the first internal electrode layer and the second internal electrode layer sandwich the dielectric layer.

16. The multilayer ceramic capacitor according to claim 14, wherein
a dimension of the first extension portion in the width direction is larger than a dimension of the first counter electrode portion in the width direction; and
a dimension of the second extension portion in the width direction is larger than a dimension of the second counter electrode portion in the width direction.

17. The multilayer ceramic capacitor according to claim 14, wherein the first internal electrode layer and the second internal electrode layer are symmetrically arranged.

18. The multilayer ceramic capacitor according to claim 14, wherein a thickness of the first internal electrode layer and the second internal electrode layer is about 0.2 μm or more and about 2.0 μm or less.

19. The multilayer ceramic capacitor according to claim 1, wherein
the first external electrode includes a first base electrode layer and a first plated layer on the first base electrode layer;
the second external electrode includes a second base electrode layer and a second plated layer on the second base electrode layer; and
the first base electrode layer and the second base electrode layer are each a sputtered electrode.

20. The multilayer ceramic capacitor according to claim 1, wherein total thicknesses of the dielectric layers are about 0.5 μm or more and about 10 μm or less.

* * * * *